US010629926B2

(12) United States Patent
Sakai et al.

(10) Patent No.: US 10,629,926 B2
(45) Date of Patent: Apr. 21, 2020

(54) SOLID OXIDE FUEL CELL SYSTEM

(71) Applicant: PANASONIC CORPORATION, Osaka (JP)

(72) Inventors: Osamu Sakai, Osaka (JP); Tatsuo Fujita, Osaka (JP); Kunihiro Ukai, Nara (JP); Takashi Kakuwa, Osaka (JP); Taiichiro Sakamoto, Kanagawa (JP); Toshiharu Ooe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 47 days.

(21) Appl. No.: 16/118,058

(22) Filed: Aug. 30, 2018

(65) Prior Publication Data

US 2018/0375126 A1 Dec. 27, 2018

Related U.S. Application Data

(62) Division of application No. 15/037,918, filed as application No. PCT/JP2015/000572 on Feb. 9, 2015, now Pat. No. 10,096,849.

(30) Foreign Application Priority Data

Apr. 25, 2014 (JP) ................................. 2014-090930

(51) Int. Cl.
*H01M 8/04225* (2016.01)
*H01M 8/04302* (2016.01)
(Continued)

(52) U.S. Cl.
CPC ......... *H01M 8/04225* (2016.02); *C01B 3/382* (2013.01); *H01M 8/04022* (2013.01);
(Continued)

(58) Field of Classification Search
CPC combination set(s) only.
See application file for complete search history.

(56) References Cited

U.S. PATENT DOCUMENTS

2008/0112859 A1 5/2008 Onuma et al.
2010/0304241 A1 12/2010 Ooe et al.
(Continued)

FOREIGN PATENT DOCUMENTS

EP 2 256 848 A1 12/2010
JP 2006-073215 A 3/2006
(Continued)

OTHER PUBLICATIONS

International Search Report and Written Opinion, issued in corresponding International Patent Application No. PCT/JP2015/000572, dated May 19, 2015; with partial English translation.
(Continued)

*Primary Examiner* — Carlos Barcena
(74) *Attorney, Agent, or Firm* — McDermott Will & Emery LLP

(57) ABSTRACT

A solid oxide fuel cell system includes: an igniting portion configured to ignite a raw material when starting up the solid oxide fuel cell system; a raw material supply portion configured to supply the raw material; a reforming air supply portion configured to supply reforming air; and an electric power generation air supply portion configured to supply electric power generation air. When starting up the solid oxide fuel cell system, the raw material supply portion supplies the raw material, and the electric power generation air supply portion supplies the electric power generation air. The igniting portion ignites the raw material. After the ignition, the reforming air supply portion supplies the reforming air. With this, the safety can be increased in consideration of characteristics in respective phases from the start-up of the solid oxide fuel cell system until the electric power generation.

2 Claims, 8 Drawing Sheets

(51) Int. Cl.

| | | |
|---|---|---|
| *H01M 8/2425* | (2016.01) | |
| *H01M 8/04014* | (2016.01) | |
| *H01M 8/1213* | (2016.01) | |
| *H01M 8/04223* | (2016.01) | |
| *H01M 8/04746* | (2016.01) | |
| *H01M 8/0612* | (2016.01) | |
| *H01M 8/2457* | (2016.01) | |
| *C01B 3/38* | (2006.01) | |
| *H01M 8/0432* | (2016.01) | |
| *H01M 8/0668* | (2016.01) | |
| *H01M 8/243* | (2016.01) | |
| *F23N 5/00* | (2006.01) | |
| *H01M 8/04089* | (2016.01) | |
| *H01M 8/124* | (2016.01) | |

(52) U.S. Cl.
CPC ... *H01M 8/04231* (2013.01); *H01M 8/04302* (2016.02); *H01M 8/04373* (2013.01); *H01M 8/04776* (2013.01); *H01M 8/0618* (2013.01); *H01M 8/0668* (2013.01); *H01M 8/1213* (2013.01); *H01M 8/2425* (2013.01); *H01M 8/2457* (2016.02); *C01B 2203/0233* (2013.01); *C01B 2203/0244* (2013.01); *C01B 2203/066* (2013.01); *C01B 2203/0811* (2013.01); *C01B 2203/1604* (2013.01); *C01B 2203/1695* (2013.01); *F23M 2900/13001* (2013.01); *F23N 5/003* (2013.01); *H01M 8/04089* (2013.01); *H01M 8/243* (2013.01); *H01M 2008/1293* (2013.01); *H01M 2300/0074* (2013.01)

(56) References Cited

U.S. PATENT DOCUMENTS

| 2010/0304247 A1 | 12/2010 | Tamura et al. |
| 2011/0269038 A1 | 11/2011 | Yukimasa et al. |
| 2013/0171534 A1 | 7/2013 | Otsuka et al. |
| 2014/0023946 A1 | 1/2014 | Akagi et al. |

FOREIGN PATENT DOCUMENTS

| JP | 2006-233011 A | 9/2006 |
| JP | 2007-187426 A | 7/2007 |
| JP | 2008-135268 A | 6/2008 |
| JP | 2009-295534 A | 12/2009 |
| JP | 2010-277844 A | 12/2010 |
| JP | 2012-079420 A | 4/2012 |
| JP | 2013-012444 A | 1/2013 |
| JP | 2013-211165 A | 10/2013 |
| JP | 2014-022233 A | 2/2014 |
| JP | 2014-022234 A | 2/2014 |
| WO | 2010/ 116685 A1 | 10/2010 |
| WO | 2012/157395 A1 | 11/2012 |

OTHER PUBLICATIONS

International Preliminary Report on Patentability, issued in corresponding International Patent Application No. PCT/JP2015/000572, dated Mar. 25, 2016.
Extended European Search Report issued in corresponding European Patent Application No. 15782495.4, dated Apr. 20, 2017
Non-Final Office Action issued in U.S. Appl. No. 15/037,918, dated Apr. 10, 2018.
Notice of Allowance issued in U.S. Appl. No. 15/037,918, dated Jul. 10, 2018.
Extended European Search Report issued in corresponding European Application No. 18186454.7 dated Oct. 16, 2018.

SOLID OXIDE FUEL CELL SYSTEM

CROSS-REFERENCE OF RELATED APPLICATIONS

This application is Divisional application of U.S. patent application Ser. No. 15/037,918, filed on May 19, 2016, which is the U.S. National Phase under 35 U.S.C. § 371 of International Patent Application No. PCT/JP2015/000572, filed on Feb. 9, 2015, which in turn claims the benefit of Japanese Application No. 2014-090930, filed on Apr. 25, 2014, the entire disclosures of which Applications are incorporated by reference herein.

TECHNICAL FIELD

The present invention relates to a solid oxide fuel cell (hereinafter referred to as a "SOFC") system and particularly to ignition processing performed when starting up the SOFC system.

BACKGROUND ART

A conventional SOFC system has been proposed, in which: an oxide ion conductive solid electrolyte is used as an electrolyte; and electrodes are provided at both respective sides of the electrolyte. This SOFC system is configured to generate electric power at high temperature with high efficiency in such a manner that a reformed gas obtained by reforming a raw material such as city gas (13A) is supplied to one of the electrodes, and air (oxygen) is supplied to the other electrode. By a chemical reaction between oxide ions having passed through the oxide ion conductive solid electrolyte and hydrogen ions, this conventional SOFC system generates steam and carbon dioxide to generate electricity and heat. The generated electricity is taken out to an outside of the SOFC system to be supplied to various electric power loads. Further, the heat generated in the electric power generation is used to heat the raw material, the air for the electric power generation, water for the reforming, and the like (see PTL 1, for example).

In a fuel cell module included in the SOFC system according to PTL 1, the reformed gas generated in a reformer is supplied to a fuel cell unit through a fuel gas supply pipe. Further, air is preheated by heat exchange with an exhaust gas using an air heat exchanger to be introduced to an electric power generating chamber through an air introduction pipe. The fuel cell unit is constituted by a plurality of cells each including: a cylindrical inner electrode layer (fuel electrode) in which a fuel gas channel is formed; a cylindrical outer electrode layer (air electrode); and an electrolyte layer provided between the inner electrode layer and the outer electrode layer. In the SOFC system according to PTL 1, the reformed gas unconsumed in the electric power generation and the air unconsumed in the electric power generation are combusted in a combustion chamber, and heat of this combustion heats the reformer and the air heat exchanger configured to preheat the air. Further, the SOFC system according to PTL 1 is configured to prevent an unburned gas or an incomplete combustion gas such as carbon monoxide, generated by the combustion in the combustion chamber, from being discharged to the outside. To be specific, the SOFC system according to PTL 1 is configured such that while giving priority to such a control operation that the temperature of the fuel cell stack falls within an appropriate temperature range, the discharge of the unburned gas or the incomplete combustion gas is suppressed by correcting the supply amount of air for the electric power generation.

Further, a method of starting up a fuel cell apparatus has been proposed, by which whether or not a gas utilized in combustion is ignited can be determined for the purpose of suppressing the generation of the unburned gas and the like (see PTL 2, for example). According to the fuel cell apparatus of PTL 2, when the gas is ignited by an ignition heater, and the temperature of a combustion region increases from a predetermined temperature $T0°$ C. to not less than a temperature $T1°$ C. within a predetermined period of time, the fuel cell apparatus of PTL 2 determines that the gas has been ignited. When the ignition is not determined within a predetermined period of time, the fuel cell apparatus of PTL 2 determines that the gas has not been ignited. As above, the fuel cell apparatus according to PTL 2 can determine whether or not the gas is ignited by the ignition heater, to suppress the discharge of the unburned gas.

CITATION LIST

Patent Literature

PTL 1: Japanese Laid-Open Patent Application Publication No. 2013-12444
PTL 2: Japanese Laid-Open Patent Application Publication No. 2008-135268

SUMMARY OF INVENTION

Technical Problem

The present invention provides a solid oxide fuel cell system having an unconventional new technology in consideration of characteristics in respective phases from the start-up of the solid oxide fuel cell system until the electric power generation.

Solution to Problem

To solve the above problems, a solid oxide fuel cell system according to one aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; and a water supply portion configured to supply reforming water to the reformer portion, wherein: when starting up the solid oxide fuel cell system, the raw material supply portion supplies the raw material to the combustor, and the electric power generation air supply portion supplies the electric power generation air to the combustor; and after the raw material is ignited by the igniting portion, the reforming air supply portion supplies the reforming air to the combustor.

To solve the above problems, a solid oxide fuel cell system according to another aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; an exhaust gas purifying portion configured to purify a flue gas generated by the combustion in the combustor; a flow rate controller configured to control flow rates of the raw material, the reforming air, the electric power generation air, and the reforming water; and a purifying portion temperature detector provided at an inlet of the exhaust gas purifying portion and configured to detect a temperature of the inlet of the exhaust gas purifying portion, wherein after the temperature of the inlet of the exhaust gas purifying portion detected by the purifying portion temperature detector becomes a predetermined temperature after the ignition, the water supply portion and the flow rate controller supplies the reforming water or increases the flow rate of the reforming water.

To solve the above problems, a solid oxide fuel cell system according to yet another aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; a temperature detector configured to detect a temperature of a heated body heated by a flue gas generated by the combustion in the combustor; and a controller, wherein the controller performs an ignition determination based on a temperature change of the heated body in a predetermined period of time after the raw material is supplied, the temperature change being obtained based on a detection result from the temperature detector.

To solve the above problems, a solid oxide fuel cell system according to still another aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; a temperature detector configured to detect a temperature of a heated body heated by a flue gas generated by the combustion in the combustor; a controller; and a storage portion storing table information showing a correspondence relation between a predetermined temperature range set as a range in which the fuel cell stack does not degrade in electric power generation and the temperature of the heated body, wherein the controller refers to the table information to control the temperature of the heated body such that a temperature of the fuel cell stack falls within the predetermined temperature range, the temperature of the heated body being detected by the temperature detector.

To solve the above problems, a solid oxide fuel cell system according to yet another aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; a temperature detector configured to detect a temperature of a heated body heated by a flue gas generated by the combustion in the combustor; a controller; and a storage portion storing table information showing a correspondence relation between the temperature of the heated body and a concentration of carbon monoxide in the flue gas, wherein the controller refers to the table information to control the temperature of the heated body such that the concentration of carbon monoxide in the flue gas becomes not more than a predetermined value, the temperature of the heated body being detected by the temperature detector.

To solve the above problems, a solid oxide fuel cell system according to still another aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; a temperature detector configured to detect a temperature of a heated body heated by a flue gas generated by the combustion in the combustor; a controller; and a storage portion storing table information showing a correspondence relation between a predetermined temperature range set as a range in which the fuel cell stack does not degrade and the temperature of the heated body and a correspondence relation between the temperature of the heated body and a concentration of carbon monoxide in the flue gas, wherein the controller refers to the table information to control the temperature of the heated body such that the temperature of the fuel cell stack falls within a predetermined temperature range, and the concentration of carbon monoxide in the flue gas becomes not more than a predetermined value, the temperature of the heated body being detected by the temperature detector.

Advantageous Effects of Invention

The solid oxide fuel cell system according to the present invention is configured as explained above, and the present invention has an effect of being able to provide a solid oxide fuel cell system having an unconventional new technology in consideration of characteristics in respective phases from the start-up of the solid oxide fuel cell system to the electric power generation.

DESCRIPTION OF EMBODIMENTS

Figure 1:
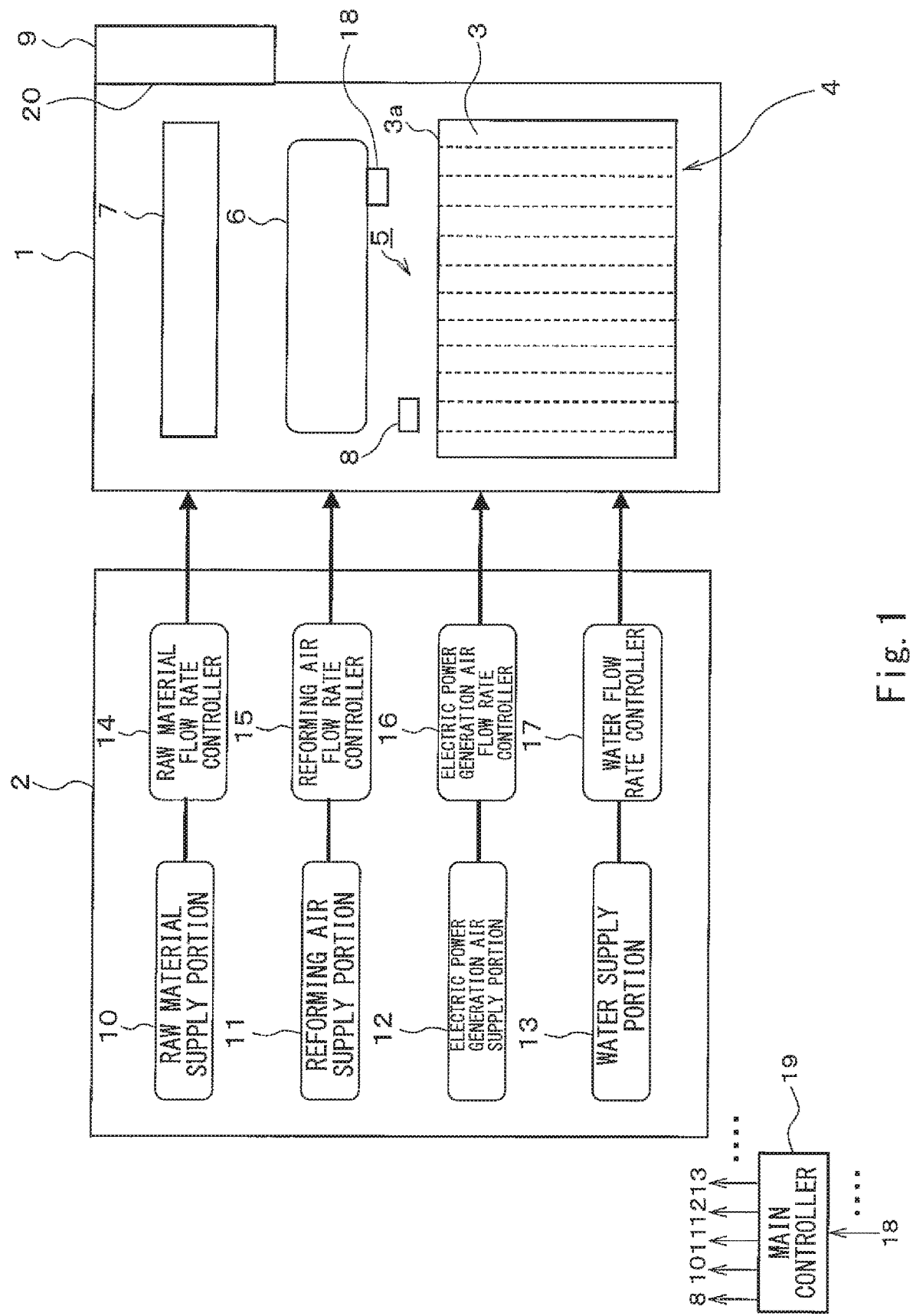
FIG. 1 is a schematic diagram showing an entire configuration of a solid oxide fuel cell (SOFC) system according to Embodiment 1 of the present invention.

Circumstances Under which One Aspect of the Present Invention was Made

The present inventors have diligently studied sequence control performed when starting up the SOFC system of PTL 1 described in "Background Art" and obtained the following findings. First, the sequence control performed when starting up the SOFC system of PTL 1 will be explained.

When starting up the SOFC system of PTL 1, reforming air is supplied to a reformer, and electric power generation air is supplied to an electric power generating chamber and a combustion chamber (combustor) through an air heat exchanger. After that, the supply of a raw material is started, and a mixture of the reforming air and the raw material is supplied to the combustion chamber through the reformer, a fuel cell stack, and a fuel cell unit.

Next, the raw material is ignited by an ignition device in the combustion chamber. Thus, the raw material and the air (the reforming air and the electric power generation air) are combusted. The raw material and the reforming air in the reformer are heated by the heat of an exhaust gas generated in the above combustion, and thus, a partial oxidation reforming reaction (PDX) proceeds. When the temperature of the reformer increases to become a predetermined temperature (600° C., for example), a gas obtained by mixing the raw material, the reforming air, and the steam in advance is supplied to the reformer, and thus, an autothermal reforming reaction (ATR) in which the above partial oxidation reforming reaction and a steam-reforming reaction (SR) coexist proceeds. When the temperature of the reformer further increases to become a predetermined temperature (700° C., for example), the supply of the reforming air is stopped, and the steam-reforming reaction (SR) between only the reformed gas and the steam proceeds. Then, the electric power generation is started.

The present inventors have found that in the sequence control performed when starting up the SOFC system, a harmful gas such as carbon monoxide tends to be generated at the time of the ignition. In PTL 1, although suppression of the generation of carbon monoxide when the SOFC system stably operates is considered, suppression of the generation of carbon monoxide at the time of the ignition performed when starting up the SOFC system is not considered.

Based on the above findings, the present inventors have found that the amount of carbon monoxide generated at the time of the ignition of the raw material can be suppressed by controlling the supply of the reforming air at the time of the ignition. Thus, the present invention was made.

When executing the autothermal reforming reaction or the steam-reforming reaction in the reformer portion, the reforming water is supplied to the reformer portion or the amount of reforming water supplied to the reformer portion is increased. The present inventors have found that the concentration of carbon monoxide in a flue gas may increase by supplying the reforming water to the reformer portion or increasing the amount of reforming water supplied to the reformer portion. Therefore, before the reforming water is supplied to the reformer portion or the amount of reforming water supplied to the reformer portion is increased, an exhaust gas purifying portion needs to be heated to a predetermined temperature at which the exhaust gas purifying portion can secure a function of removing carbon monoxide in the flue gas. Thus, the present inventors have found that the concentration of carbon monoxide in the flue gas discharged from the fuel cell module can be reduced in such a manner that: the temperature of the exhaust gas purifying portion is monitored; and the reforming water is not supplied to the reformer portion or the amount of reforming water supplied to the reformer portion is not increased until the temperature of the exhaust gas purifying portion reaches the predetermined temperature by the heat of the flue gas. The present inventors have further found that by the above control operation, the exhaust gas purifying portion can be heated only by the heat of the flue gas, and therefore, it is unnecessary to additionally provide a heater or the like. Thus, the present invention was made.

Further, the present inventors have examined the temperature of the reformer portion heated by the heat of the flue gas and the temperature of the fuel cell stack and found that the temperature of the reformer portion heated by the heat of the flue gas and the temperature of the fuel cell stack correlate with each other. Furthermore, the present inventors have found that the temperature of the reformer portion and the concentration of carbon monoxide in the flue gas correlate with each other. To be specific, the present inventors have found that the temperature of the fuel cell stack and the concentration of carbon monoxide can be controlled by controlling the temperature of the reformer portion. In addition, the present inventors have found that whether or not the ignition in the combustion chamber is performed can be determined based on a temperature change of the reformer portion in a predetermined period of time.

Specifically, the present invention provides the following aspects.

A solid oxide fuel cell system according to a first aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; and a water supply portion configured to supply reforming water to the reformer portion, wherein: when starting up the solid oxide fuel cell system, the raw material supply portion supplies the raw material to the combustor, and the electric power generation air supply portion supplies the electric power generation air to the combustor; and after the raw material is ignited by the igniting portion, the reforming air supply portion supplies the reforming air to the combustor.

According to the above configuration, when starting up the solid oxide fuel cell system, only the raw material and the electric power generation air are supplied to the combustor, and the raw material is ignited by the igniting portion to be combusted together with the electric power generation air. After the ignition, the reforming air is supplied to the combustor according to the sequence. As above, the raw material with which the reforming air is mixed can be prevented from being supplied to the combustor at the time of the ignition. Therefore, the deterioration of ignition stability by the reforming air can be avoided. In addition, flame stability can be increased by the promotion of diffusion combustion of the raw material and the electric power generation air, and thus, the generation of carbon monoxide can be suppressed. On this account, the solid oxide fuel cell system can suppress carbon monoxide generated at the time of the ignition.

Thus, the present invention has an effect of being able to provide a solid oxide fuel cell system having an unconventional new technology capable of suppressing the generation of carbon monoxide from the start-up of the solid oxide fuel cell system until the electric power generation especially in consideration of characteristics at the time of the ignition.

A solid oxide fuel cell system according to a second aspect may be configured such that in the solid oxide fuel cell system according to the first aspect, the reforming air supply portion supplies the reforming air to the combustor after the ignition such that: a flow rate of the reforming air per unit time falls within a range of not more than a predetermined flow rate per unit time; and magnitude of an inclination showing a change rate of the flow rate of the reforming air per unit time falls within a predetermined range. It should be noted that as long as the magnitude of the inclination showing the change rate of the flow rate of the reforming air per unit time falls within the predetermined range, the flow rate of the reforming air may be increased in a stepwise, curved, or linear (monotonic) manner. To be specific, the reforming air is not increased at once by a predetermined flow rate but may be supplied so as to be gradually increased.

A solid oxide fuel cell system according to a third aspect may be configured such that: in the solid oxide fuel cell system according to the first or second aspect, as prepurge performed before the ignition, the electric power generation air supply portion supplies the electric power generation air, and the reforming air supply portion supplies the reforming air; after that, the reforming air supply portion stops supplying the reforming air, and the raw material supply portion starts supplying the raw material; and the raw material is ignited by the igniting portion in the combustor to be combusted together with the electric power generation air.

A solid oxide fuel cell system according to a fourth aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; an exhaust gas purifying portion configured to purify a flue gas generated by the combustion in the combustor; a flow rate controller configured to control flow rates of the raw material, the reforming air, the electric power generation air, and the reforming water; and a purifying portion temperature detector provided at an inlet of the exhaust gas purifying portion and configured to detect a temperature of the inlet of the exhaust gas purifying portion, wherein after the temperature of the inlet of the exhaust gas purifying portion detected by the purifying portion temperature detector becomes a predetermined temperature after the ignition, the water supply portion and the flow rate controller supplies the reforming water or increases the flow rate of the reforming water.

The predetermined temperature as the temperature of the inlet of the exhaust gas purifying portion is a temperature at which the exhaust gas purifying portion can secure a function of removing a toxic substance such as carbon monoxide contained in the flue gas.

According to the above configuration, after the temperature of the inlet of the exhaust gas purifying portion becomes the predetermined temperature after the ignition, the water supply portion and the flow rate controller cooperate to supply the reforming water or increase the flow rate of the reforming water. When the reforming water is supplied or the flow rate of the reforming water is increased, steam is ejected to the combustor together with the reformed gas. Therefore, the flame stability decreases, and the concentration of carbon monoxide generated increases. However, according to the sequence of the solid oxide fuel cell system of the present invention, after the temperature of the inlet of the exhaust gas purifying portion becomes the predetermined temperature, the reforming water is supplied or the flow rate of the reforming water is increased. Therefore, even if the concentration of carbon monoxide in the flue gas becomes high, carbon monoxide can be removed by the exhaust gas purifying portion.

To be specific, according to the solid oxide fuel cell system of the fourth aspect, the purifying performance is secured by increasing the temperature of the inlet of the exhaust gas purifying portion, and then, the supply of the reforming water or the increase in the flow rate of the reforming water, which tend to cause the generation of the harmful gas such as carbon monoxide, is performed. Therefore, the concentration of carbon monoxide in the flue gas discharged to the outside (outside of the fuel cell module) can be reduced.

Thus, the present invention has an effect of being able to provide a solid oxide fuel cell system having an unconventional new technology of reducing the concentration of carbon monoxide in the discharged flue gas especially in the phase of shifting from the partial oxidation reforming reaction to the autothermal reforming reaction in the operations of the solid oxide fuel cell system in consideration of a characteristic in which the concentration of carbon monoxide increases by the supply of the reforming water or the increase in the flow rate of the reforming water.

A solid oxide fuel cell system according to a fifth aspect may be configured such that in the solid oxide fuel cell system according to the fourth aspect, the exhaust gas purifying portion includes a catalyst for purification.

A solid oxide fuel cell system according to a sixth aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; a temperature detector configured to detect a temperature of a heated body heated by a flue gas generated by the combustion in the combustor; and a controller, wherein the controller performs an ignition determination based on a temperature change of the heated body in a predetermined period of time after the raw material is supplied, the temperature change being obtained based on a detection result from the temperature detector.

One example of the heated body is a reformer heated by utilizing the heat of the flue gas. Further, for example, when the heated body is the reformer, the temperature detected by the temperature detector may be an internal temperature of the reformer or a temperature of a wall surface of the reformer.

According to the above configuration, the temperature of the heated body heated by the flue gas is set as a detection target of a temperature change utilized as a determination criteria for the ignition determination, and examples thereof includes the internal temperature of the heated body and the temperature change of the wall surface of the heated body. As above, the temperature change of the combustion region is not set as the detection target, but the temperature change of the heated body is set as the detection target. Therefore, the stability of the flame generated in the combustor can be prevented from being deteriorated by the temperature detector.

On this account, while suppressing the generation of carbon monoxide due to the deterioration of the flame stability, the ignition determination can be surely performed. Therefore, the solid oxide fuel cell system having high safety can be provided.

Thus, the present invention has an effect of being able to provide a solid oxide fuel cell system having an unconventional new technology capable of surely performing the ignition determination while suppressing the generation of carbon monoxide especially at the time of the ignition in the operations from the start-up of the solid oxide fuel cell system until the electric power generation in consideration of characteristics at the time of the ignition.

A solid oxide fuel cell system according to a seventh aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; a temperature detector configured to detect a temperature of a heated body heated by a flue gas generated by the combustion in the combustor; a controller; and a storage portion storing table information showing a correspondence relation between a predetermined temperature range set as a range in which the fuel cell stack does not degrade in electric power generation and the temperature of the heated body, wherein the controller refers to the table information to control the temperature of the heated body such that a temperature of the fuel cell stack falls within the predetermined temperature range, the temperature of the heated body being detected by the temperature detector.

One example of the heated body is a reformer heated by utilizing the heat of the flue gas. Further, for example, when the heated body is the reformer, the temperature detected by the temperature detector may be an internal temperature of the reformer or a temperature of a wall surface of the reformer.

According to the above configuration, since the storage portion storing the table information is included, the temperature change of the heated body is detected, the temperature change of the fuel cell stack corresponding to the detected temperature change of the heated body can be understood. Therefore, by monitoring the temperature change of the heated body, the temperature of the heated body or the temperature of the fuel cell stack can be controlled so as to fall within a predetermined temperature range at the time of the electric power generation.

Thus, the solid oxide fuel cell system according to the seventh aspect can safely perform the electric power generation while securing the durability of the fuel cell stack.

On this account, the present invention has an effect of being able to provide a solid oxide fuel cell system having an unconventional new technology capable of securing the durability of the fuel cell stack especially in the electric power generation of the solid oxide fuel cell system in consideration of characteristics at the time of the electric power generation.

A solid oxide fuel cell system according to an eighth aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; a temperature detector configured to detect a temperature of a heated body heated by a flue gas generated by the combustion in the combustor; a controller; and a storage portion storing table information showing a correspondence relation between the temperature of the heated body and a concentration of carbon monoxide in the flue gas, wherein the controller refers to the table information to control the temperature of the heated body such that the concentration of carbon monoxide in the flue gas becomes not more than a predetermined value, the temperature of the heated body being detected by the temperature detector.

One example of the heated body is a reformer heated by utilizing the heat of the flue gas. Further, for example, when the heated body is the reformer, the temperature detected by the temperature detector may be an internal temperature of the reformer or a temperature of a wall surface of the reformer.

According to the above configuration, since the storage portion storing the table information is included, the temperature change of the heated body is detected, and the concentration of carbon monoxide in the flue gas corresponding to the temperature change of the heated body can be understood. Therefore, by monitoring the temperature change of the heated body, the concentration of carbon monoxide in the flue gas can be controlled to become not more than a predetermined value at the time of the electric power generation.

Thus, the solid oxide fuel cell system according to the eighth aspect can safely perform the electric power generation while suppressing the concentration of carbon monoxide to not more than the predetermined value.

On this account, the present invention has an effect of being able to provide the solid oxide fuel cell system having an unconventional new technology capable of suppressing the concentration of carbon monoxide to not more than the predetermined value especially in the electric power generation of the solid oxide fuel cell system in consideration of characteristics at the time of the electric power generation.

A solid oxide fuel cell system according to a ninth aspect includes: a fuel cell module including a fuel cell stack configured to cause a reaction between a reformed gas and electric power generation air to generate electric power, the reformed gas being generated by reforming a raw material, a reformer portion configured to reform the raw material to generate the reformed gas, an igniting portion configured to ignite the raw material when starting up the solid oxide fuel cell system, and a combustor that is a space where the raw material ignited by the igniting portion is combusted together with the electric power generation air; a raw material supply portion configured to supply the raw material to the fuel cell module; an electric power generation air supply portion configured to supply the electric power generation air to the fuel cell module; a reforming air supply portion configured to supply reforming air to the reformer portion; a water supply portion configured to supply reforming water to the reformer portion; a temperature detector configured to detect a temperature of a heated body heated by a flue gas generated by the combustion in the combustor; a controller; and a storage portion storing table information showing a correspondence relation between a predetermined temperature range set as a range in which the fuel cell stack does not degrade and the temperature of the heated body and a correspondence relation between the temperature of the heated body and a concentration of carbon monoxide in the flue gas, wherein the controller refers to the table information to control the temperature of the heated body such that the temperature of the fuel cell stack falls within a predetermined temperature range, and the concentration of carbon monoxide in the flue gas becomes not more than a predetermined value, the temperature of the heated body being detected by the temperature detector.

One example of the heated body is a reformer heated by utilizing the heat of the flue gas. Further, for example, when the heated body is the reformer, the temperature detected by the temperature detector may be an internal temperature of the reformer or a temperature of a wall surface of the reformer.

According to the above configuration, since the storage portion storing the table information is included, the temperature of the fuel cell stack corresponding to the temperature of the heated body detected by the temperature detector can be understood based on the temperature of the heated body. Therefore, by monitoring the temperature change of the heated body, the temperature of the heated body or the temperature of the fuel cell stack can be controlled so as to fall within a predetermined temperature range at the time of the electric power generation.

Furthermore, the concentration of carbon monoxide in the flue gas corresponding to the temperature change of the heated body can be understood. Therefore, by monitoring the temperature change of the heated body, the concentration of carbon monoxide in the flue gas can be controlled so as to become not more than the predetermined value at the time of the electric power generation.

On this account, the solid oxide fuel cell system according to the ninth aspect can suppress the concentration of carbon monoxide to not more than the predetermined value and safely perform the electric power generation while performing such a control operation that the temperature of the heated body or the temperature of the fuel cell stack falls within the predetermined temperature range.

Thus, the present invention has an effect of being able to provide a solid oxide fuel cell system having an unconventional new technology capable of securing the durability of the fuel cell stack and suppressing the concentration of carbon monoxide to not more than the predetermined value especially at the time of the electric power generation of the solid oxide fuel cell system in consideration of characteristics at the time of the electric power generation.

A solid oxide fuel cell system according to a tenth aspect may be configured such that in the solid oxide fuel cell system according to any one of the seventh to ninth aspects, the temperature of the heated body in the table information is set so as to correspond to an amount of generated electric power.

A solid oxide fuel cell system according to an eleventh aspect may be configured such that in the solid oxide fuel cell system according to any one of the sixth to tenth aspects, the heated body is the reformer portion.

A solid oxide fuel cell system according to a twelfth aspect may be configured such that: in the solid oxide fuel cell system according to any one of the first to eleventh aspects, the fuel cell stack is provided upstream of the combustor; the fuel cell stack is constituted by a plurality of cells; and flames are generated in vicinities of outlets of the cells.

Hereinafter, embodiments of the present invention will be explained in reference to the drawings.

Embodiment 1

Configuration of Solid Oxide Fuel Cell System

FIG. 1 is a schematic diagram showing an entire configuration of a solid oxide fuel cell (SOFC) system according to Embodiment 1 of the present invention. For more clearly explaining the present invention, FIG. 1 does not especially show flow routes of a raw material, a reformed gas, reforming air, reforming water, and electric power generation air in a fuel cell module 1.

As shown in FIG. 1, the SOFC system includes the fuel cell module 1 and an auxiliary unit 2. A stack 4 is provided in the fuel cell module 1 and is configured such that a plurality of cells 3 are electrically joined to one another in series. For example, each of the cells 3 includes: a cylindrical inner electrode layer in which a passage through which the reformed gas flows is formed; a cylindrical outer electrode layer; and an electrolyte layer provided between the inner electrode layer and the outer electrode layer. The cell 3 can be configured such that the inner electrode layer is a fuel electrode, and the outer electrode layer is an air electrode. The reformed gas flowing through the inner electrode layer is ejected from an outlet portion 3a formed at an upper end portion of the cylindrical cell 3, and the electric power generation air having contacted the outer electrode layer also flows out from the outlet portion 3a side of the cylindrical cell 3. The cell 3 is not limited to such a cylindrical cell and may be, for example, a flat plate type cell.

A combustion chamber (combustor) 5 is provided at an upper portion of the stack 4, and an igniting portion 8 is included in the combustion chamber 5. The ignition portion 8 performs ignition to combust the supplied raw material and air (electric power generation air). For example, city gas (13A) can be utilized as the raw material. A reformer portion 6 is provided at an upper portion of the combustion chamber 5. The reformer portion 6 reforms the raw material, supplied from an outside through the auxiliary unit 2, to generate the reformed gas. Further, an air preheating portion 7 is provided at an upper portion of the reformer portion 6. The air preheating portion 7 preheats the electric power generation air supplied from the outside through the auxiliary unit 2. A flue gas generated by combusting the raw material and the air in the combustion chamber 5 heats the reformer portion 6 and the air preheating portion 7 to be discharged to the outside of the system through an exhaust gas outlet portion 20 of the fuel cell module 1. An exhaust gas purifying portion 9 is provided at the exhaust gas outlet portion 20 and is configured to be able to remove harmful gas such as carbon monoxide contained in the flue gas.

The auxiliary unit 2 includes a raw material supply portion 10, a reforming air supply portion 11, an electric power generation air supply portion 12, a water supply portion 13, a raw material flow rate controller 14, a reforming air flow rate controller 15, an electric power generation air flow rate controller 16, and a water flow rate controller 17. The raw material flow rate controller 14, the reforming air flow rate controller 15, the electric power generation air flow rate controller 16, and the water flow rate controller 17 constitute a flow rate controller of the present invention.

The raw material supply portion 10 supplies the raw material to the fuel cell module 1. The reforming air supply portion 11 supplies the reforming air to the fuel cell module 1. When both the raw material and the reforming air are supplied to the fuel cell module 1, these are mixed with each other at an upstream side of the reformer portion 6, and the resulting mixture flows from the reformer portion 6 to the inner electrode layers of the cells 3 to be introduced to the combustion chamber 5. When a reforming reaction is not being performed in the reformer portion 6, the raw material flows through the inner electrode layers of the cells 3. When the reforming reaction is being performed in the reformer portion 6, the reformed gas flows through the inner electrode layers of the cells 3. The electric power generation air supply portion 12 supplies the electric power generation air to the fuel cell module 1. The water supply portion 13 supplies water for reforming (i.e., reforming water) to the fuel cell module 1.

Each of the raw material supply portion 10, the reforming air supply portion 11, the electric power generation air supply portion 12, and the water supply portion 13 can be constituted by a pump or the like. The flow rates of fluids (the raw material, the air, the water) supplied by the raw material supply portion 10, the reforming air supply portion 11, the electric power generation air supply portion 12, and the water supply portion 13 are controlled by the raw material flow rate controller 14, the reforming air flow rate controller 15, the electric power generation air flow rate controller 16, and the water flow rate controller 17, respectively, and the fluids are fed to the fuel cell module 1. Each of the raw material flow rate controller 14, the reforming air flow rate controller 15, the electric power generation air flow rate controller 16, and the water flow rate controller 17 can be constituted by a solenoid valve or the like.

The SOFC system includes a main controller (controller) 19. Various control operations of respective portions included in the SOFC system are performed based on control commands from the main controller 19. The main controller 19 can be constituted by a CPU or the like.

Operations at the Time of Start-Up

Next, main operations performed when starting up the SOFC system according to Embodiment 1 configured as above will be explained. First, when starting up the SOFC system, the raw material and the electric power generation air are supplied to the combustion chamber. Specifically, the raw material supply portion 10 of the auxiliary unit 2 supplies the raw material such as the city gas (13A) to the fuel cell module 1 through the raw material flow rate controller 14. The raw material supplied to the fuel cell module 1 flows through the reformer portion 6 and then flows through the cells 3 to be ejected to the combustion chamber 5 through the outlet portions 3a formed at the upper end portions of the cells 3. On the other hand, the electric power generation air supply portion 12 of the auxiliary unit 2 supplies the electric power generation air to the fuel cell module 1 through the electric power generation air flow rate controller 16. The electric power generation air supplied to the fuel cell module 1 flows through the air preheating portion 7 to be fed to the cells 3. Then, the electric power generation air is fed to the combustion chamber 5 through the outlet portions 3a formed at the upper end portions of the cells 3.

When the raw material and the electric power generation air are supplied to the combustion chamber 5 as above, the igniting portion 8 is operated to ignite the raw material. With this, flames can be formed in the vicinities of the respective outlet portions 3a of the cells 3, and the raw material and the electric power generation air can be combusted at a predetermined air ratio (a ratio of an actual air amount to a theoretical air amount required for complete combustion of the raw material). The flue gas generated in the combustion chamber 5 as above heats heated bodies, such as the reformer portion 6 and the air preheating portion 7, provided above the combustion chamber 5. Then, the flue gas flows through the exhaust gas purifying portion 9 to be discharged to the outside of the fuel cell module 1.

The reformer portion 6 is heated to a desired temperature (temperature necessary to perform a partial oxidation reforming reaction) by the flue gas generated in the combustion chamber 5 as above. After that, the supply of the reforming air to the fuel cell module 1 is started. To be specific, when the main controller 19 determines after the ignition that a detection result of a temperature detecting sensor (temperature detector) 18 provided on an outer wall of the reformer portion 6 has reached the above desired temperature, the main controller 19 gives commands to the reforming air supply portion 11 and reforming air flow rate controller 15 of the auxiliary unit 2 to cause the reforming air supply portion 11 and reforming air flow rate controller 15 of the auxiliary unit 2 to supply the reforming air to the fuel cell module 1. In accordance with the command from the main controller 19, the reforming air flow rate controller 15 adjusts, for example, an opening degree of the solenoid valve such that the reforming air flows at a predetermined flow rate. Then, in accordance with the command from the main controller 19, the reforming air supply portion 11 supplies the reforming air to the fuel cell module 1 through the reforming air flow rate controller 15. The reforming air supplied to the fuel cell module 1 is fed to the reformer portion 6 to be heated in the reformer portion 6. At this point in time, the reformer portion 6 is being heated by the flue gas. Therefore, the reforming air and the raw material mixed with each other in the reformer portion 6 are heated, so that the partial oxidation reforming reaction proceeds.

When the temperature in the reformer portion 6 further increases to become a predetermined temperature (500° C., for example), the water supply portion 13 of the auxiliary unit 2 supplies the reforming water to the fuel cell module 1 through the water flow rate controller 17. The reforming water supplied to the fuel cell module 1 is fed to the reformer portion 6. To be specific, when the main controller 19 determines that the detection result of the temperature detecting sensor 18 has reached a predetermined temperature (500° C., for example), the main controller 19 gives commands to the water supply portion 13 and the water flow rate controller 17 to cause the water supply portion 13 and the water flow rate controller 17 to supply the reforming water to the fuel cell module 1. In accordance with the command from the main controller 19, the water flow rate controller 17 adjusts, for example, an opening degree of the solenoid valve such that the reforming water flows at a predetermined flow rate. Then, in accordance with the command from the main controller 19, the water supply portion 13 supplies the reforming water to the fuel cell module 1 through the water flow rate controller 17. When the reforming water is supplied to the reformer portion 6 as above, a steam-reforming reaction also proceeds in addition to the above partial oxidation reforming reaction, that is, an autothermal reforming reaction in which the partial oxidation reforming reaction and the steam-reforming reaction coexist proceeds.

Further, when the temperature in the reformer portion 6 increases to become a predetermined temperature (600° C., for example), the reforming air supply portion 11 stops the supply of the reforming air. To be specific, when the main controller 19 determines that the detection result of the temperature detecting sensor 18 has reached a predetermined temperature (600° C., for example), the main controller 19 gives commands to the reforming air supply portion 11 and the reforming air flow rate controller 15 to cause the reforming air supply portion 11 and the reforming air flow rate controller 15 to stop the supply of the reforming air to the fuel cell module 1. Then, in accordance with the commands from the main controller 19, the reforming air flow rate controller 15 closes, for example, the solenoid valve, and the reforming air supply portion 11 stops the supply of the reforming air. When the supply of the reforming air is stopped as above, the reformer portion 6 proceeds with the steam-reforming reaction only by the raw material and the steam. After the reforming reaction in the reformer portion 6 shifts from the autothermal reforming reaction to the steam-reforming reaction, the SOFC system starts the electric power generation. During the electric power generation, the fuel (reformed gas) unconsumed in the electric power generation and the electric power generation air unconsumed in the electric power generation are combusted in the combustion chamber 5, and the generated flue gas heats the reformer portion 6 and the air preheating portion 7.

As above, the cells 3 are provided upstream of the combustion chamber 5, and the flames are formed in the combustion chamber 5 and in the vicinities of the outlet portions 3a of the cells 3. Therefore, the number of flames can be made large, and the length of each flame can be made short, so that the combustion chamber 5 can be reduced in size. As a result, the fuel cell module 1 can be reduced in size.

When starting up the SOFC system according to Embodiment 1, the reactions sequentially proceed in the reformer portion 6 in order of the partial oxidation reforming reaction, the autothermal reforming reaction, and the steam-reforming reaction. However, the partial oxidation reforming reaction may be omitted, and the autothermal reforming reaction and the reforming reaction may proceed in this order.

Figure 2:
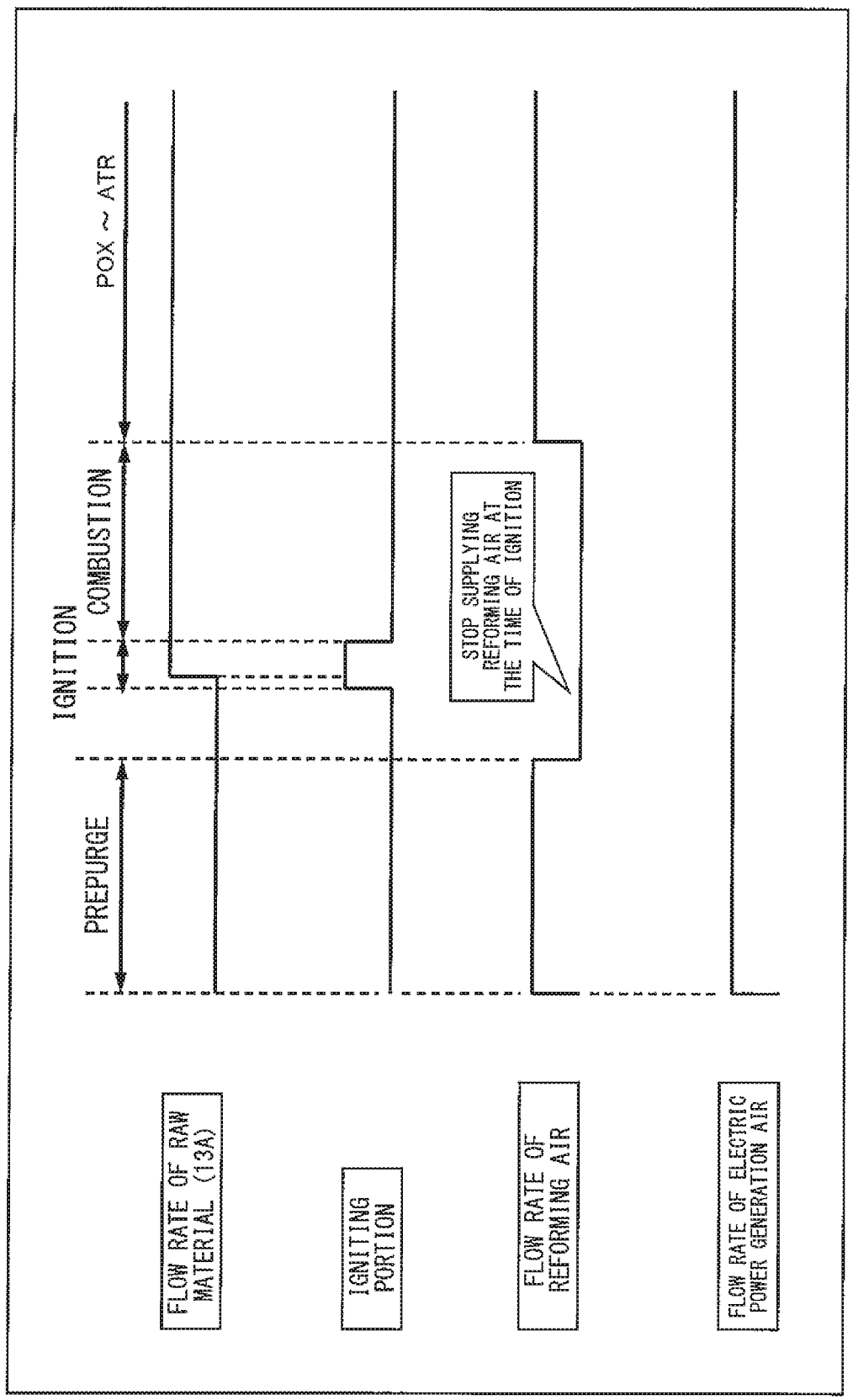
FIG. 2 is a time chart showing one example of operations performed when starting up the solid oxide fuel cell (SOFC) system according to Embodiment 1 of the present invention.

Next, timings of the flow of each fluid (the raw material, the electric power generation air, or the reforming air) in the operations performed when starting up the SOFC system will be explained in reference to FIG. 2. FIG. 2 is a time chart showing one example of the operations performed when starting up the solid oxide fuel cell (SOFC) system according to Embodiment 1 of the present invention.

FIG. 2 shows periods before and after the ignition and a period in which the reforming reaction performed in the reformer portion 6 changes from the partial oxidation reforming reaction to the autothermal reforming reaction. To be specific, FIG. 2 shows a period in which prepurge is performed, a period in which ignition is performed, a period in which the raw material is combusted by the ignition, and a period in which the partial oxidation reforming reaction and the autothermal reforming reaction proceed in this order. In FIG. 2, a horizontal axis is a time axis. FIG. 2 shows, from an upper side, a time-series change of ON/OFF of the raw material flow rate (whether or not the raw material is supplied), a time-series change of ON/OFF of the igniting portion 8, a time-series change of ON/OFF of the reforming air flow rate (whether or not the reforming air is supplied), and a time-series change of ON/OFF of the electric power generation air flow rate (whether or not the electric power generation air is supplied). It should be noted that: the ON of the raw material flow rate, the reforming air flow rate, or the electric power generation air flow rate denotes a state where the raw material, the reforming air, or the electric power generation air is being supplied; and the OFF of the raw material flow rate, the reforming air flow rate, or the electric power generation air flow rate denotes a state where the supply of the raw material, the reforming air, or the electric power generation air is being stopped. In FIG. 2, on a straight line extending in a horizontal axis direction and showing a time course of each of the raw material flow rate, the igniting portion, the reforming air flow rate, and the electric power generation air flow rate, a rise-up section corresponds to an ON state, and a fall-down section corresponds to an OFF state.

First, in the SOFC system, before the igniting portion 8 performs the ignition, prepurge is performed, that is, moisture, residual gas, and the like remaining inside and outside the cells 3 are removed by utilizing the reforming air and the electric power generation air. Specifically, in the period in which the prepurge is performed, the reforming air supply portion 11 supplies the reforming air to the fuel cell module 1, and the electric power generation air supply portion 12 supplies the electric power generation air to the fuel cell module 1. Then, the supplied reforming air and electric power generation air are fed to the inside and outside of the cells 3. Thus, the moisture, the residual gas, and the like remaining inside and outside the cells 3 are discharged to the outside, that is, removed. After the prepurge is performed and before the igniting portion 8 performs the ignition, the reforming air supply portion 11 stops the supply of the reforming air. A predetermined period of time is set as the period in which the prepurge is performed, and the main controller 19 starts up a timer portion (not shown) to manage the lapse of the predetermined period of time. When the predetermined period of time in which the prepurge is performed elapses, the main controller 19 gives a command to the reforming air supply portion 11 to cause the reforming air supply portion 11 to stop the supply of the reforming air. In accordance with this command, the reforming air supply portion 11 stops the supply of the reforming air.

When the supply of the reforming air is stopped, the main controller 19 gives a command to the igniting portion 8 to cause the igniting portion 8 to perform the ignition. In accordance with the command from the main controller 19, the igniting portion 8 performs the ignition. While the igniting portion 8 is performing the ignition, the main controller 19 gives a command to the raw material supply portion 10 to cause the raw material supply portion 10 to supply the raw material to the fuel cell module 1. In accordance with the command from the main controller 19, the raw material supply portion 10 starts the supply of the raw material. When the raw material and the electric power generation air are supplied to the combustion chamber 5, and the raw material is combusted by the ignition of the igniting portion 8, the igniting portion 8 stops the ignition. When the raw material and the electric power generation air are combusted, and the reformer portion 6 becomes a predetermined temperature by the generated flue gas, the main controller 19 gives a command to the reforming air supply portion 11 to cause the reforming air supply portion 11 to restart the supply of the reforming air. In accordance with the command from the main controller 19, the reforming air supply portion 11 starts the supply of the reforming air. Thus, the partial oxidation reforming reaction is performed in the reformer portion 6.

According to the conventional SOFC system disclosed in, for example, PTL 1, the reforming air is continuously supplied to the fuel cell module 1 even at the time of the ignition performed after the period in which the prepurge is performed. However, according to the SOFC system of Embodiment 1, in a state where the supply of the reforming air is stopped, and only the raw material and the electric power generation air are being supplied, the raw material is ignited by the igniting portion to be combusted. Therefore, according to the SOFC system of Embodiment 1, the raw material with which the reforming air is mixed is not supplied to the combustion chamber 5 at the time of the ignition. Thus, the deterioration of the ignition stability can be avoided. Further, after the ignition, the electric power generation air as oxygen necessary for maintaining the combustion flows into the combustion chamber 5 by diffusion from an outside of the flames. Thus, the flame stability can be increased, and the generation of carbon monoxide can be suppressed.

Generation of Carbon Monoxide

Hereinafter, the generation of carbon monoxide will be explained based on a comparison between a configuration in which as in the SOFC system according to Embodiment 1, the supply of the reforming air is stopped at the time of the ignition and a configuration in which as in the conventional system, the supply of the reforming air is not stopped at the time of the ignition.

When the reforming air at a flow rate of 6 NL/min was supplied and ignited together with the raw material at the time of the ignition as in the conventional system, a peak value of the concentration of carbon monoxide generated was 250 ppm. On the other hand, when the supply of the reforming air was stopped at the time of the ignition as in the SOFC system according to Embodiment 1, the peak value of the concentration of carbon monoxide generated was reduced to 50 ppm.

At the time of the start-up, the conventional system performs so-called premix combustion in which: the mixture of the raw material and the reforming air is ejected from the insides of the cylindrical cells 3 to the combustion chamber 5; the electric power generation air is fed from the outside of the cylindrical cells 3 to the combustion chamber 5; the igniting portion 8 is operated to ignite the raw material; and the flames are formed at the outlet portions 3a of the cells 3.

When performing the premix combustion using, for example, a Bunsen burner, flame is formed in such a manner that: primary air (corresponding to the reforming air) for combustion is induced by a pressure difference generated by dynamic pressure generated when the raw material is ejected; and secondary air (corresponding to the electric power generation air) for combustion is diffused and suctioned from surroundings. On the other hand, according to the SOFC system of Embodiment 1, the reforming air corresponding to the primary air is not induced but is forcibly supplied, and the electric power generation air corresponding to the secondary air is not diffused or suctioned but is forcibly supplied. Therefore, the ignition can be performed only in a low flow velocity region at the outlet portions 3a of the cells 3 in the combustion chamber 5, and therefore, back fire may occur, that is, the flame may flow back from the outlet portions 3a of the cells 3 into the cells 3. To suppress this back fire, the outlet portions 3a of the cells 3 need to be formed by thin tubes, and a flame quenching distance at the outlet portion 3a needs to be not more than a predetermined distance. Forming the outlet portion 3a of the cell 3 by the thin tube is effective against the suppression of the back fire. However, it is thought that when the reforming air is mixed with the raw material, the flame stability at the time of the ignition deteriorates, and the amount of carbon monoxide generated increases.

Factors dominating the ignition property (the generation of carbon monoxide) in the SOFC system were verified in more detail. To be specific, an ignition limit and a carbon monoxide generation peak value at the time of the ignition were examined in accordance with a primary air ratio based on the reforming air flow rate and a total air ratio obtained by adding the reforming air flow rate to the electric power generation air flow rate. It was found that the suppression of the generation of carbon monoxide was affected by the primary air ratio based on the reforming air flow rate. To be specific, because of differences in configuration from the Bunsen burner or the like, the ignition stability was deteriorated by mixing the reforming air in the raw material. Specifically, it was found that when the primary air ratio became significantly small (0 to 0.1), the carbon monoxide generation peak value was suppressed.

Based on the above verification results, the supply of the reforming air is stopped at the time of the ignition as explained in FIG. 2. With this, the ignition stability becomes excellent, and as described above, the carbon monoxide generation peak value at the time of ignition can be reduced to 50 ppm.

As above, according to the SOFC system of Embodiment 1, before the ignition of the raw material, the prepurge is performed by supplying the electric power generation air and the reforming air. After that, the supply of only the reforming air is stopped. Next, the supply of the raw material is started, and the raw material is combusted in the combustion chamber 5 together with the electric power generation air that is continuously supplied. After that, the reforming air is supplied again according to the sequence. As above, by performing the prepurge when starting up the SOFC system, the moisture and residual gas remaining in the cells 3 are removed. Thus, the ignition stability can be increased, and the generation of carbon monoxide can be suppressed.

Modified Example 1

Figure 3:
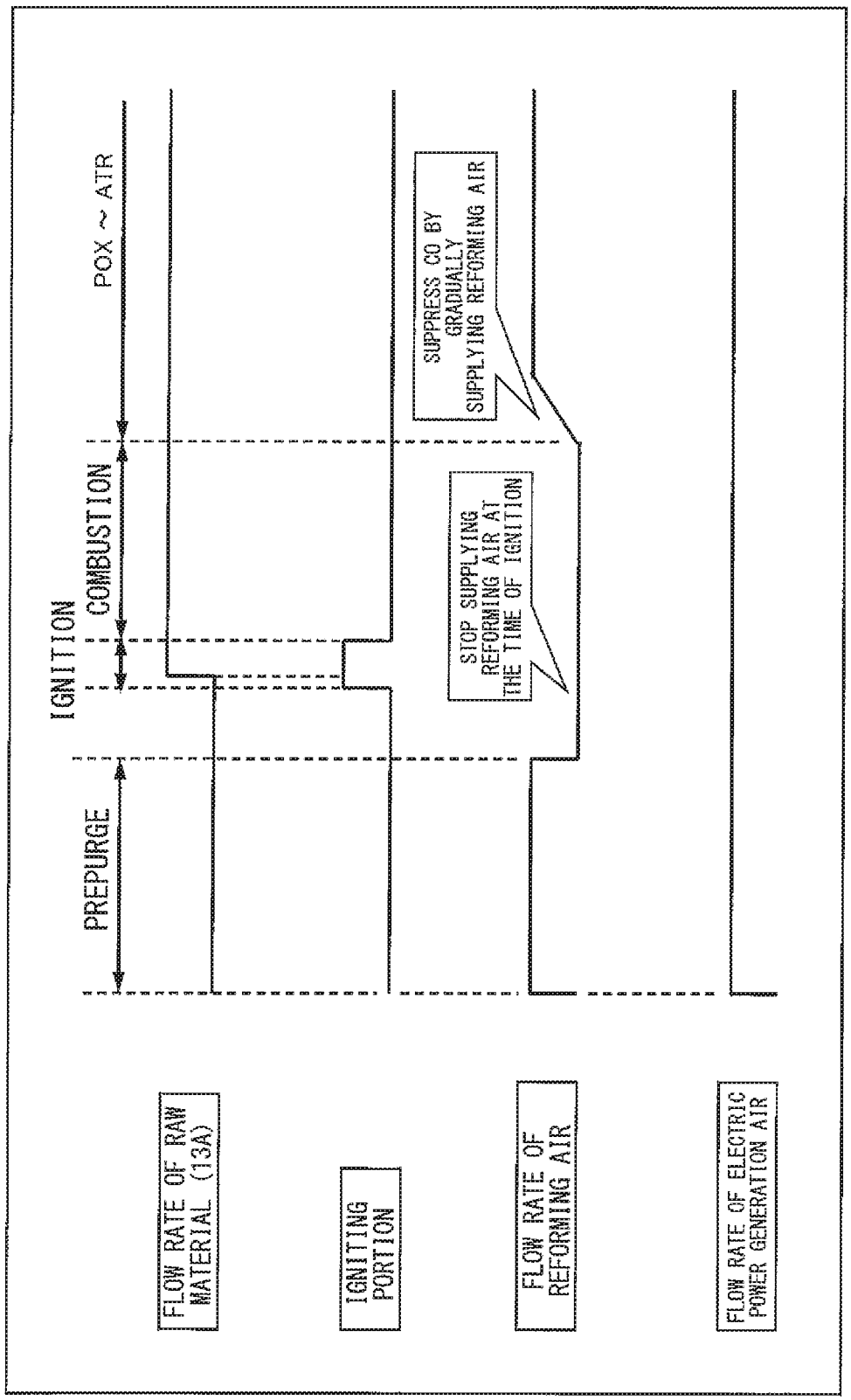
FIG. 3 is a time chart showing one example of operations performed when starting up the solid oxide fuel cell (SOFC) system according to Modified Example 1 of Embodiment 1 of the present invention.

According to the SOFC system of Embodiment 1, the reforming air to be supplied again after the ignition as shown in FIG. 2 is supplied to the fuel cell module 1 at a predetermined flow rate when the reformer portion 6 is heated to the desired temperature. However, in the SOFC system of Embodiment 1, as shown in FIG. 3, the reforming air may be gradually supplied to the fuel cell module 1 such that the flow rate of the reforming air per unit time falls within a range of not more than a predetermined flow rate, and for example, monotonously increases. FIG. 3 is a time chart showing one example of operations performed when starting up the solid oxide fuel cell (SOFC) system according to Modified Example 1 of Embodiment 1 of the present invention. As with FIG. 2, FIG. 3 shows periods before and after the ignition and a period until which the autothermal reforming reaction is performed in the reformer portion 6. To be specific, FIG. 3 shows a period in which prepurge is performed, a period in which ignition is performed, a period in which the raw material is combusted by the ignition, and a period in which the partial oxidation reforming reaction and the autothermal reforming reaction proceed in this order.

As shown in FIG. 3, according to the SOFC system of Modified Example of Embodiment 1, when restarting the supply of the reforming air after the ignition, the reforming air flow rate controller 15 gradually changes the opening degree in accordance with the command from the main controller 19, and the reforming air supply portion 11 supplies the reforming air to the fuel cell module 1. At this time, the reforming air flow rate controller 15 adjusts the flow rate of the reforming air per unit time such that the flow rate of the reforming air per unit time falls within a range of not more than a predetermined flow rate and increases in increments of, for example, 0.1 NL/sec.

As above, by supplying the reforming air to the fuel cell module 1 after the ignition while gradually increasing the flow rate of the reforming air, the deterioration of the flame stability can be avoided, and the generation of carbon monoxide can be further suppressed.

Embodiment 2

The foregoing has explained that in each of the SOFC system of Embodiment 1 and the SOFC system of Modified Example 1, the generation of carbon monoxide is suppressed by devising the timing of the supply of the reforming air when starting up the SOFC system, especially in the periods before and after the ignition and the period in which the partial oxidation reforming reaction proceeds in the reformer portion 6.

Figure 4:
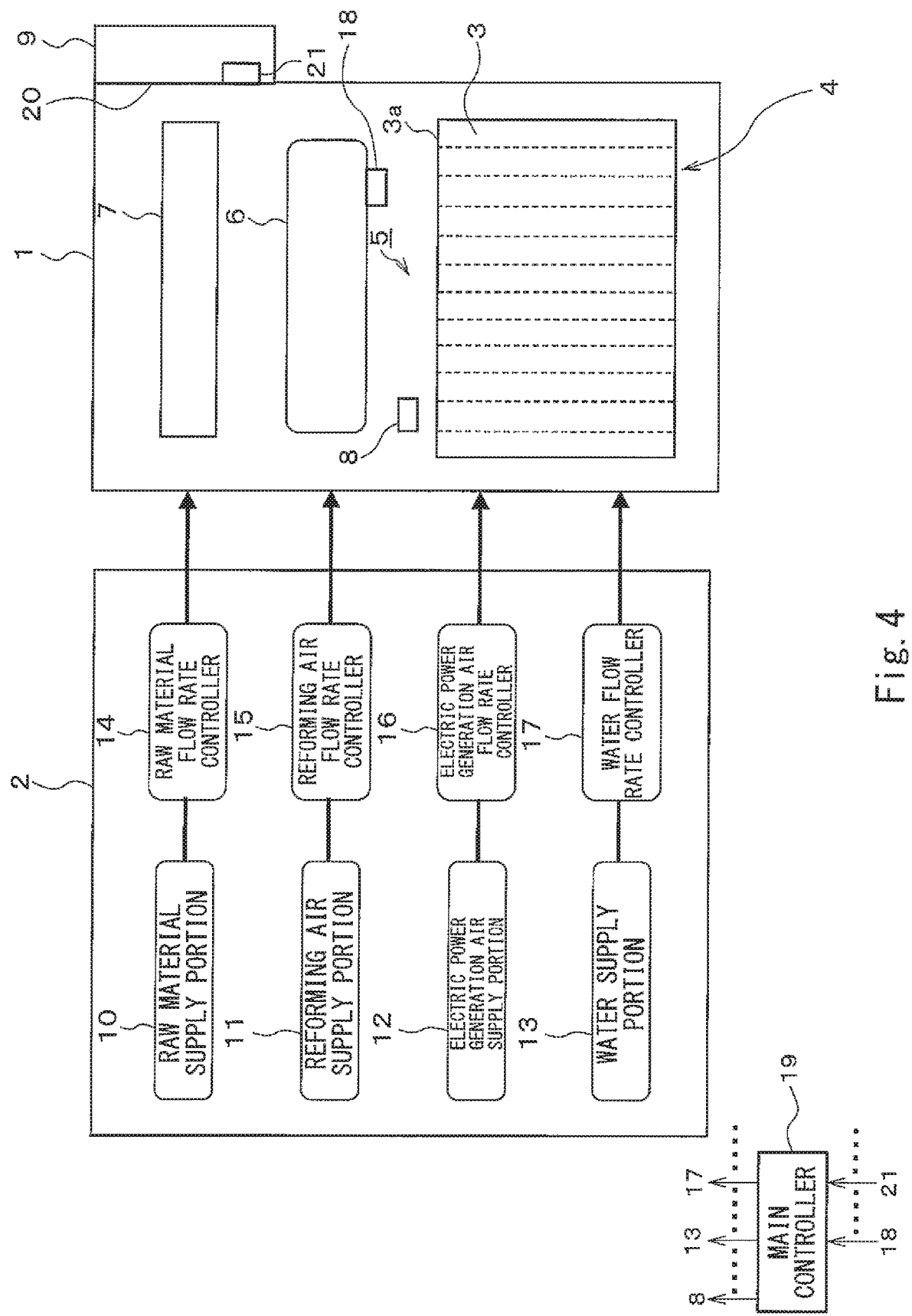
FIG. 4 is a schematic diagram showing an entire configuration of the solid oxide fuel cell (SOFC) system according to Embodiment 2 of the present invention.

As shown in FIG. 4, the SOFC system according to Embodiment 2 is configured such that the SOFC system according to Embodiment 1 further includes a purifying portion temperature detecting sensor (purifying portion temperature detector) 21 configured to detect the temperature of an inlet part of the exhaust gas purifying portion 9 and provided at the inlet part of the exhaust gas purifying portion 9. The SOFC system according to Embodiment 2 is different from the SOFC system according to Embodiment 1 in that the main controller 19 gives commands to the water supply portion 13 and the water flow rate controller 17 based on the detection result of the purifying portion temperature detecting sensor 21 to cause the water supply portion 13 and the water flow rate controller 17 to supply the reforming water to the reformer portion 6 of the fuel cell module 1 at a predetermined flow rate. Especially, according to the SOFC system of Embodiment 2, the main controller 19 gives commands to the water supply portion 13 and the water flow rate controller 17 based on the detection result of the purifying portion temperature detecting sensor 21 to cause the water supply portion 13 and the water flow rate controller 17 to increase the predetermined flow rate of the reforming water at an appropriate timing. Except for this, the SOFC system according to Embodiment 2 is the same in configuration as the SOFC system according to Embodiment 1. Therefore, the same reference signs are used for the same members, and explanations thereof are omitted.

FIG. 4 is a schematic diagram showing an entire configuration of the solid oxide fuel cell (SOFC) system according to Embodiment 2 of the present invention. As with FIG. 1, for more clearly explaining the present invention, FIG. 4 does not especially show flow routes of the raw material, the reformed gas (fuel), the reforming gas, the reforming water, and the electric power generation air in the fuel cell module 1.

The flow rate of the reforming water is increased because of the following reasons. To be specific, if a large amount of reforming water is supplied before the temperatures of the reformer portion 6, the cell 3, and the like are adequately increased, problems occur, in which: the operation stability deteriorates; the flame temperature decreases; and the concentration of carbon monoxide generated thereby increases. According to the SOFC system of Embodiment 2, while gradually supplying the reforming water, the flow rate of the reforming water supplied is increased based on the temperature of the exhaust gas purifying portion 9 which increases in temperature together with the reformer portion 6, the cell 3, and the like.

Timing at which the Flow Rate of the Reforming Water is Increased

Figure 5:
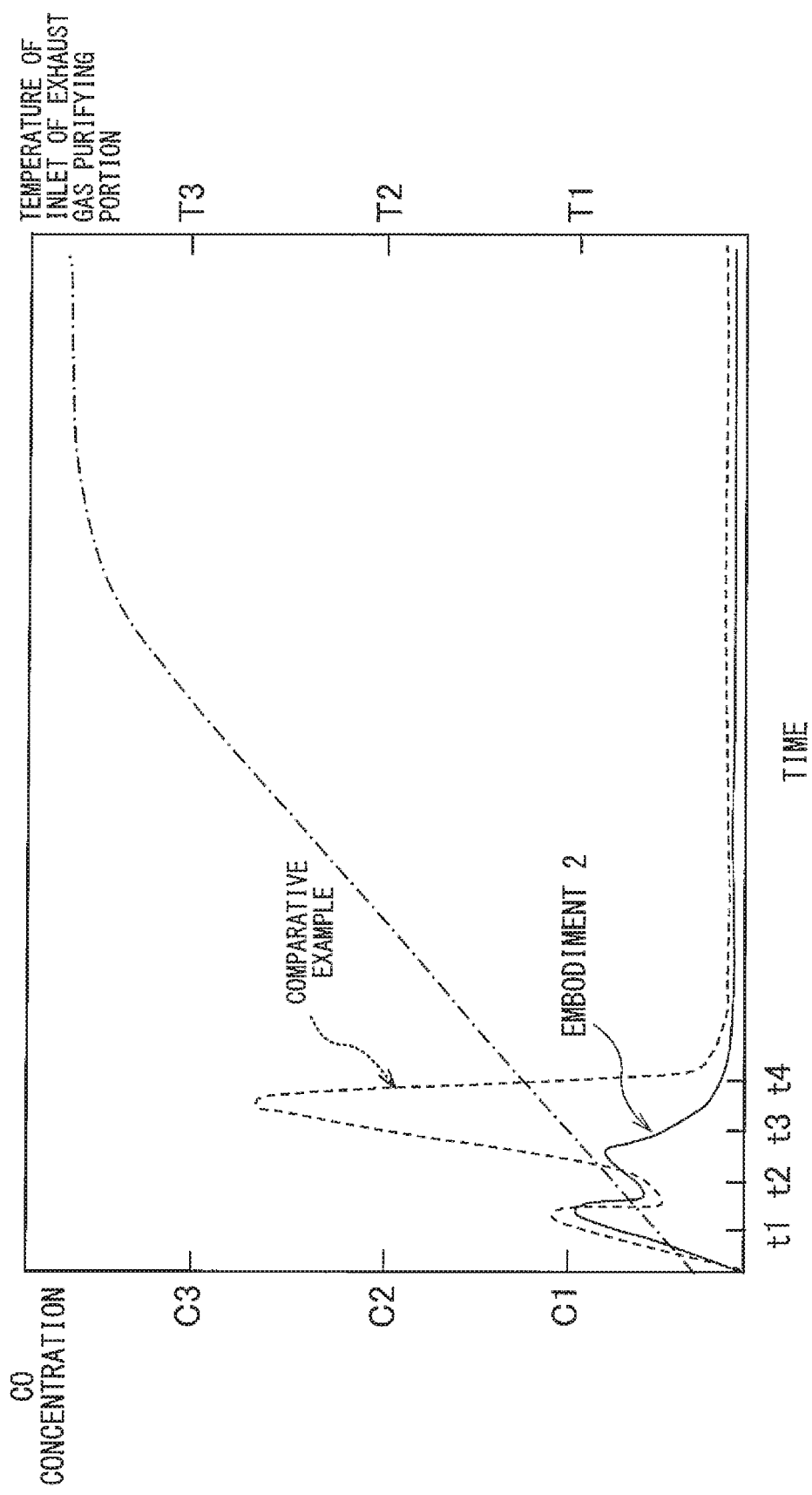
FIG. 5 is a graph showing a relation between a concentration of CO in a flue gas discharged to an outside when starting up the solid oxide fuel cell (SOFC) system according to Embodiment 2 of the present invention and a temperature (inlet temperature) of an inlet part of an exhaust gas purifying portion.

Next, the timing at which the flow rate of the reforming water supplied to the reformer portion 6 is increased in the SOFC system according to Embodiment 2 configured as above will be explained in reference to FIG. 5. FIG. 5 is a graph showing a relation between a concentration of CO in the flue gas discharged to an outside when starting up the solid oxide fuel cell (SOFC) system according to Embodiment 2 of the present invention and the temperature (inlet temperature) of the inlet part of the exhaust gas purifying portion 9. In the graph of FIG. 5, a horizontal axis shows a time (t), a left vertical axis shows the concentration (C) of CO in the flue gas discharged to the outside, and a right vertical axis shows an inlet temperature (T) of the exhaust gas purifying portion 9.

In the graph of FIG. 5, a broken line shows a time-series change of the CO concentration in the SOFC system according to Comparative Example used to explain the effects of the SOFC system according to Embodiment 2, a solid line shows a time-series change of the CO concentration in the SOFC system according to Embodiment 2, and a one-dot chain line shows a time-series change of the inlet temperature of the exhaust gas purifying portion 9. In the graph of FIG. 5, t1 shows a time elapsed from the start-up until the ignition, t2 shows a time elapsed from the start-up until the start of the supply of the reforming water, t3 shows a time elapsed from the start-up of the SOFC system according to Comparative Example until when the flow rate of the reforming water is increased for the first time, and t4 shows a time elapsed from the start-up of the SOFC system according to Comparative Example until when the flow rate of the reforming water is further increased. As described below, t4 also shows a time elapsed from the start-up of the SOFC system according to Embodiment 2 until when the flow rate of the reforming water is increased for the first time.

In FIG. 5, C1 on the vertical axis showing the CO concentration corresponds to a value at which a peak value of the CO concentration of the SOFC system according to Embodiment 2 mainly appears, and T1 on the vertical axis showing the inlet temperature of the exhaust gas purifying portion 9 corresponds to a predetermined temperature (120° C., for example) at which the function of the exhaust gas purifying portion 9 can be secured. As shown in FIG. 5, the exhaust gas purifying portion 9 is heated by the flue gas generated by the combustion chamber 5, so that the inlet temperature of the exhaust gas purifying portion 9 gradually increases. After a certain period of time has elapsed, the inlet temperature of the exhaust gas purifying portion 9 substantially becomes constant.

In FIG. 5, two peaks that are different in magnitude from each other appear on each of the time-series change (solid line) of the CO concentration of the SOFC system according to Embodiment 2 and the time-series change (broken line) of the CO concentration of the SOFC system according to Comparative Example. In the SOFC system according to Embodiment 2, the first peak appears by the CO generated at the time of the ignition. The second peak appears by the reforming water supplied when shifting from the partial oxidation reforming reaction to the autothermal reforming reaction and shows that by the supply of the reforming water, the flame stability is deteriorated, and the CO concentration is increased.

On the other hand, in the SOFC system according to Comparative Example, the first peak appears by the CO generated at the time of the ignition. The second peak appears by the reforming water supplied when shifting from the partial oxidation reforming reaction to the autothermal reforming reaction and the increase in the flow rate of the reforming water for the first time, and at each of a time when the reforming water is supplied and a time when the flow rate of the reforming water is increased for the first time, the flame stability is deteriorated, and the CO is generated, so that the CO concentration significantly increases.

As shown in FIG. 5, in the SOFC system according to Embodiment 2, the increase in the CO concentration by the increase in the flow rate of the reforming water for the first time does not occur. In contrast, in the SOFC system according to Comparative Example, the increase in the CO concentration by the increase in the flow rate of the reforming water for the first time causes the second peak to be high. Differences therebetween will be explained below.

The SOFC system according to Embodiment 2 and the SOFC system according to Comparative Example are different from each other in that: in Embodiment 2, the flow rate of the reforming water is not increased at the time t3 but is increased at the time t4; and in Comparative Example, the flow rate of the reforming water supplied to the reformer portion 6 is increased at the time t3. When the flow rate of the reforming water supplied to the reformer portion 6 is increased, the steam is ejected from the outlet portions 3a of the cells 3 together with the reforming air and the reformed gas (fuel). Therefore, the flame stability deteriorates, and the concentration of CO generated increases. As in the SOFC system according to Comparative Example, when the flow rate of the reforming water is increased at the time t3, the inlet temperature of the exhaust gas purifying portion 9 at the time t3 is lower than an activation temperature (120° C., for example) of a purification catalyst (oxidation catalyst) included in the exhaust gas purifying portion 9, so that the function of purifying the exhaust gas is not adequately secured in the exhaust gas purifying portion 9. Therefore, in the SOFC system according to Comparative Example, the concentration of CO in the flue gas discharged to the outside (outside of the fuel cell module) at the time t3 cannot be reduced. As shown by the broken line in the graph of FIG. 5, the second peak of the CO concentration is high.

On the other hand, as in the SOFC system according to Embodiment 2, when the flow rate of the reforming water is increased at the time t4, the inlet temperature of the exhaust gas purifying portion 9 at the time t4 is higher than the activation temperature (T1) of the purification catalyst, so that the function of purifying the exhaust gas is adequately secured in the exhaust gas purifying portion 9. Therefore, the concentration of CO in the flue gas discharged to the outside can be reduced. As a result, as shown by the solid line in the graph of FIG. 5, an excellent exhaust gas characteristic is realized without the generation of the peak of the CO concentration by the increase in the flow rate of the reforming water.

As described above, on the solid line showing the time-series change of the CO concentration in the SOFC system according to Embodiment 2, the slight second peak is generated by the supply of the reforming water. However, the second peak of the CO concentration can also be avoided by configuring the SOFC system according to Embodiment 2 such that until the inlet temperature of the exhaust gas purifying portion 9 reaches the activation temperature of the purification catalyst, the partial oxidation reforming reaction proceeds and the reforming water is not supplied.

The purification catalyst included in the exhaust gas purifying portion 9 may be, for example, an oxidation catalyst mainly containing precious metal, and a CO purifying performance can be secured by this purification catalyst. To secure the purifying performance of the purification catalyst, the temperature of the purification catalyst needs to be not less than a predetermined temperature. Therefore, the SOFC system may be configured such that: a heater configured to heat the exhaust gas purifying portion 9 is additionally included; and when starting up the SOFC system, the temperature of the purification catalyst is increased by the heater to not less than the predetermined temperature. However, as described above, the SOFC system according to Embodiment 2 executes such an original sequence that in consideration of the characteristics of the reforming reaction to be executed, the flow rate of the reforming water is not increased until the temperature of the purification catalyst reaches a predetermined temperature at which the purification catalyst is activated. Therefore, the heater is not required.

In the SOFC system according to Embodiment 2, the exhaust gas purifying portion 9 includes, as the purification catalyst, the oxidation catalyst mainly containing the precious metal. However, the material and shape of the purification catalyst are not limited as long as the CO purifying performance can be secured. The exhaust gas purifying portion 9 includes the purification catalyst which is activated at a predetermined temperature. However, the exhaust gas purifying portion 9 does not have to include the purification catalyst and may be configured arbitrarily as long as the CO can be efficiently removed at not less than a predetermined temperature.

Embodiment 3

Figure 6:
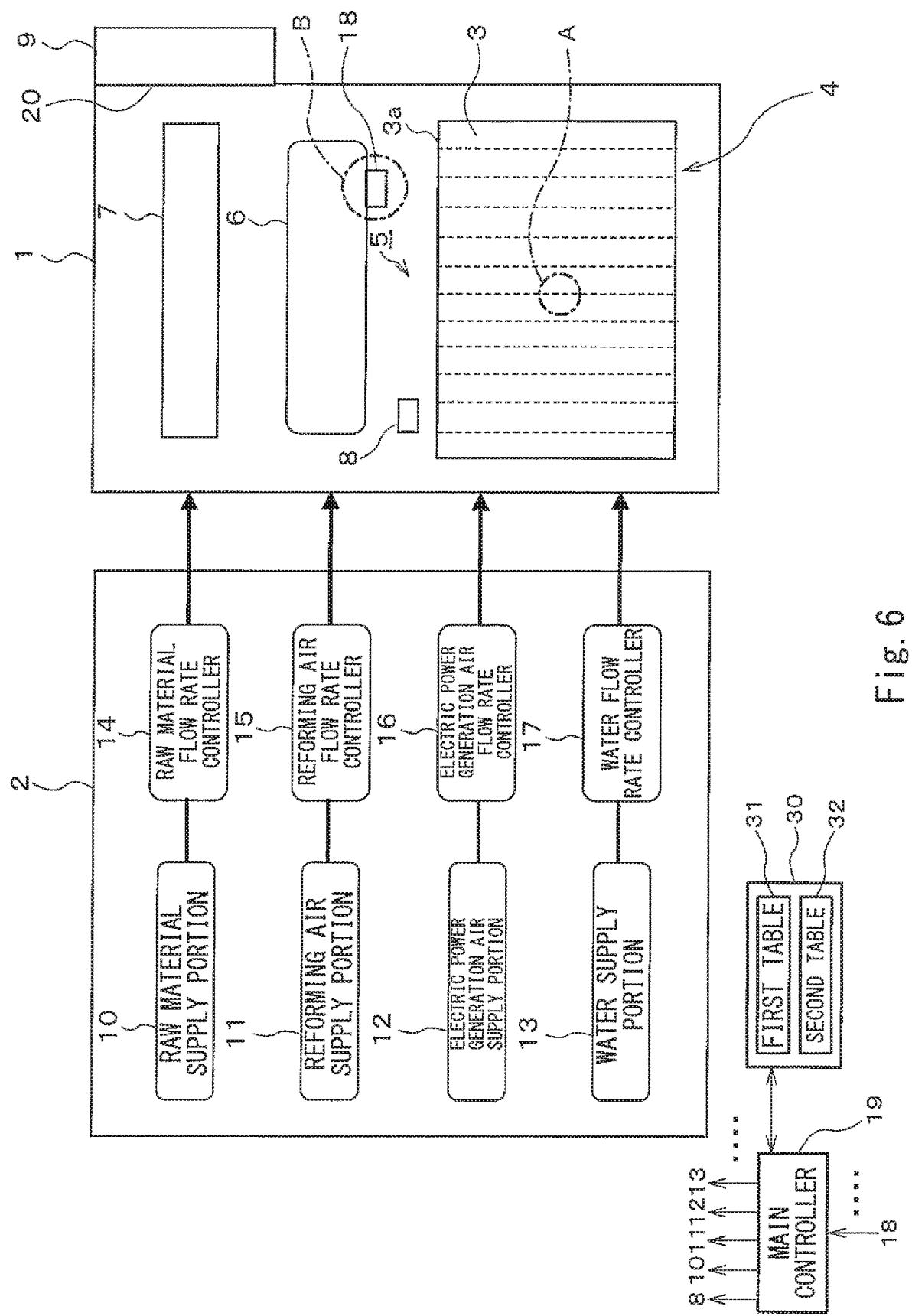
FIG. 6 is a schematic diagram showing an entire configuration of the solid oxide fuel cell (SOFC) system according to Embodiment 3 of the present invention.
Figure 7:
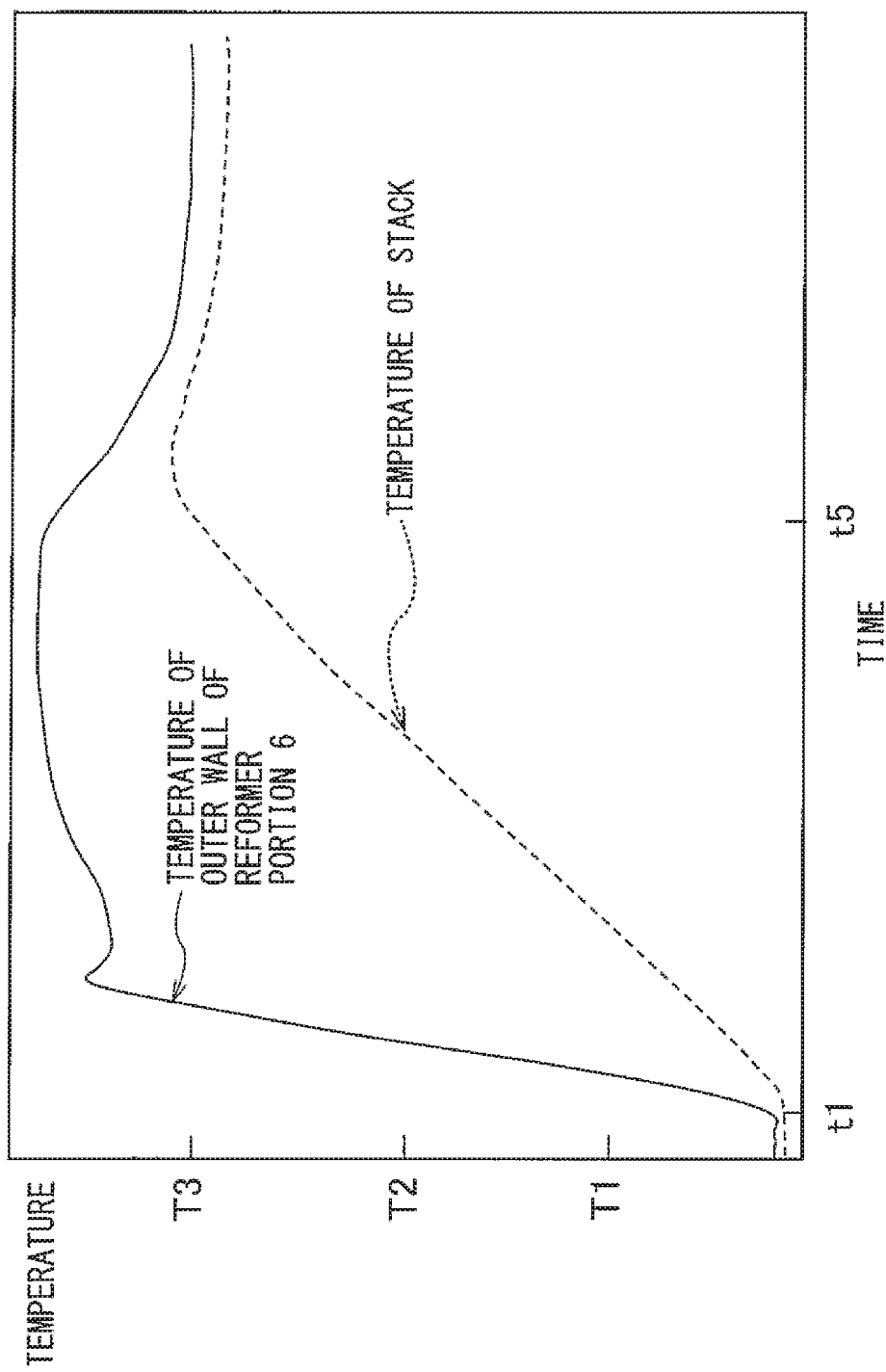
FIG. 7 is a graph showing temperature characteristics of a reformer portion and a stack when starting up the solid oxide fuel cell (SOFC) system according to Embodiment 3.

In reference to FIGS. 6 and 7, the following will explain, as the SOFC system according to Embodiment 3, a SOFC system configured such that: the temperature change of the stack 4 is understood based on the temperature change of the reformer (heated body) 6; and ignition determination processing is performed, that is, whether or not the raw material is ignited by the igniting portion 8 in the combustion chamber 5 is determined. FIG. 6 is a schematic diagram showing an entire configuration of the solid oxide fuel cell (SOFC) system according to Embodiment 3 of the present invention. As with FIGS. 1 and 4, for more clearly explaining the present invention, FIG. 6 does not especially show flow routes of the raw material, the reformed gas (fuel), the reforming gas, the reforming water, and the electric power generation air in the fuel cell module 1. FIG. 7 is a graph showing temperature characteristics of the reformer portion 6 and the stack 4 when starting up the solid oxide fuel cell (SOFC) system according to Embodiment 3.

As shown in FIG. 6, the SOFC system according to Embodiment 3 is configured such that the SOFC system according to Embodiment 1 includes a storage portion 30 storing table information 31 showing a correspondence relation between a temperature of the outer wall of the reformer portion 6 and a temperature of the stack in accordance with an operating time of the SOFC system. Except for this, the SOFC system according to Embodiment 3 is the same in configuration as the SOFC system according to Embodiment 1. Therefore, the same reference signs are used for the same members, and explanations thereof are omitted.

First, a relation between the temperature of the outer wall of the reformer portion 6 that is the heated body heated by the flue gas generated in the combustion chamber 5 and the temperature (stack temperature) of the stack 4 will be explained in reference to FIG. 7. In the graph of FIG. 7, a horizontal axis shows a time (t), a vertical axis shows a temperature (T), a broken line shows the stack temperature, a solid line shows the temperature of the outer wall of the reformer portion 6 that is the heated body, t1 shows a time elapsed from the start-up until the ignition, and t5 shows a time elapsed from the start-up until the start of the electric power generation.

In Embodiment 3, the stack temperature was measured at a position (shown by "A" in FIG. 6) in the vicinity of the cell 3 located in the middle of the stack 4 in both the horizontal direction and the vertical direction. Further, the temperature of the outer wall of the reformer portion 6 was measured at a position (shown by "B" in FIG. 6) located above the flame generated in the combustion chamber 5 and under the reformer portion 6. Then, the table information 31 showing the correspondence relation between the stack temperature and the temperature of the outer wall of the reformer portion 6 was created. Since the reforming water vaporized at the inlet part of the reformer portion 6, the temperature was measured at the outer wall located in the vicinity of an outlet part where the reforming reaction proceeded.

As shown in FIG. 7, the stack temperature and the temperature of the outer wall of the reformer portion 6 increase from a time (t1) when the raw material is supplied and ignited after the SOFC system according to Embodiment 3 is started up. A heat capacity of the stack 4 is larger than a heat capacity of the outer wall of the reformer portion 6. Therefore, the stack temperature gradually increases. In contrast, the temperature of the outer wall of the reformer portion 6 rapidly increases since the flame is generated immediately under the reformer portion 6. As above, the outer wall of the reformer portion 6 is high in responsiveness to the temperature change of the fuel cell module 1.

Referring to FIG. 7, the magnitude of the temperature change of the outer wall of the reformer portion 6 per unit time and the magnitude of the temperature change of the stack per unit time are different from each other but are correlated to each other. To be specific, as the reforming reactions, that is, the partial oxidation reforming reaction, the autothermal reforming reaction, and the steam-reforming reaction proceed in the reformer portion 6 after the ignition of the raw material, the temperature of the outer wall of the reformer portion 6 and the stack temperature increase as shown in FIG. 7. When the electric power generation is started and continued with a rated output (800 W, for example), each of the temperature of the outer wall of the reformer portion 6 and the stack temperature stabilizes at a predetermined temperature (630° C., for example). To be specific, the temperature change of the stack is correlated to the temperature change of the outer wall of the reformer portion 6. Therefore, for example, by detecting the temperature of the reformer portion 6 having excellent responsiveness to the rapid temperature change by the combustion, the temperature change of the stack can be surely and quickly understood. The table information 31 showing the correspondence relation between the temperature characteristic of the outer wall of the reformer portion 6 and the temperature characteristic of the stack as shown in FIG. 7 is prepared in advance and stored in the storage portion 30. Then, the SOFC system according to Embodiment 3 is configured such that: the main controller 19 can refer to the table information 31 to understand the stack temperature based on the temperature of the outer wall of the reformer portion 6 detected by the temperature detecting sensor 18.

The SOFC system is further configured such that: the temperature of the reformer portion 6 having excellent responsiveness to the temperature change is detected; and based on the detected temperature change, the ignition determination of the raw material is performed. With this, highly reliable combustion detection can be realized in the fuel cell module 1. Hereinafter, the ignition determination in the SOFC system according to Embodiment 3 will be explained.

Ignition Determination

According to the SOFC system of Embodiment 3, the temperature of the reformer portion 6 is set as a detection target of the temperature detecting sensor 18. Based on the detection result of the temperature detecting sensor 18, the main controller 19 understands the temperature change of the reformer portion 6 in a predetermined period of time after the supply of the raw material. Then, the ignition determination of the raw material by the igniting portion 8 is performed based on the temperature change understood by the main controller 19. For example, when the main controller 19 determines that the temperature of the outer wall of the reformer portion 6 has been increased by not less than a predetermined temperature (15° C., for example) within a predetermined period of time (20 seconds, for example) after the supply of the raw material, the main controller 19 determines that the raw material has been ignited in the combustion chamber 5. In contrast, when the main controller 19 determines that the temperature of the outer wall of the reformer portion 6 has been increased by less than a predetermined temperature (15° C., for example) within a predetermined period of time (20 seconds, for example), the main controller 19 determines that the raw material has not been ignited.

For example, in the ignition determination, the temperature of the combustion region (i.e., the temperature of the flue gas in the combustion chamber 5) may be set as the detection target of the temperature detecting sensor 18. In this case, the temperature of the combustion region is further higher in responsiveness to the temperature change than the temperature of the outer wall of the reformer portion 6. However, if the position of the flame generated in the combustion chamber 5 and the position of the temperature detecting sensor 18 are away from each other by not less than a predetermined distance, the detection accuracy may deteriorate. In contrast, if the temperature detecting sensor 18 is provided in the vicinity of the flame, problems occur, in which the flame stability deteriorates, and carbon monoxide is generated. Therefore, in the SOFC system according to Embodiment 3, the temperature change of the temperature detecting sensor 18 provided on the outer wall portion of the reformer portion 6 is utilized in the ignition determination.

However, the detection target detected for performing the ignition determination is not limited to the temperature of the outer wall of the reformer portion 6 and may be the temperature of a different member that changes in temperature by the combustion in the combustion chamber 5. Instead of the temperature of the outer wall of the reformer portion 6, the detection target may be an internal temperature of the reformer portion 6 or the temperature of an inner wall of the reformer portion 6. The temperature detecting sensor 18 configured to detect the temperature of the reformer portion 6 for switching the reforming reactions performed in the reformer portion 6 as described in Embodiment 1 can also serve as the temperature detecting sensor 18 utilized for the ignition determination. Therefore, it is unnecessary to additionally provide the temperature detecting sensor 18 for the ignition determination, so that there is an advantage that the number of parts can be reduced.

Modified Example 1

As described above, the SOFC system according to Embodiment 3 is configured such that by utilizing the temperature of the outer wall of the reformer portion 6 having high responsiveness to the temperature change, the stack temperature is understood, and the ignition determination of the raw material by the igniting portion 8 in the combustion chamber 5 is performed. The SOFC system according to Modified Example 1 of Embodiment 3 is configured such that by utilizing the correspondence relation between the temperature of the outer wall of the reformer portion 6 and the stack temperature, the stack temperature is managed so as to fall within a predetermined temperature range, such as an endurance limit range. It should be noted that the endurance limit range denotes a range from a stack endurance upper limit temperature to a stack endurance lower limit temperature and is a temperature range set as a range in which the stack 4 does not degrade. To secure the long life of the cell 3 as an actual device, it is important to operate the system such that the stack temperature falls within the endurance limit range when the fuel cell module 1 is thermally stable, such as when the electric power generation is being continued with the rated output.

The SOFC system according to Modified Example 1 of Embodiment 3 is the same in configuration as the SOFC system according to Embodiment 3 except for contents of the table information 31 stored in the storage portion 30. Therefore, the same reference signs are used for the same components, and explanations thereof are omitted. Although details will be described later, in the SOFC system according to Modified Example 1 of Embodiment 3, the storage portion 30 stores the table information 31 showing a correspondence relation between the amount of generated electric power and the temperature of the reformer portion 6 corresponding to each of the stack endurance upper limit temperature and the stack endurance lower limit temperature. It should be noted that a main storage device such as a main memory can be utilized as the storage portion 30.

Figure 8:
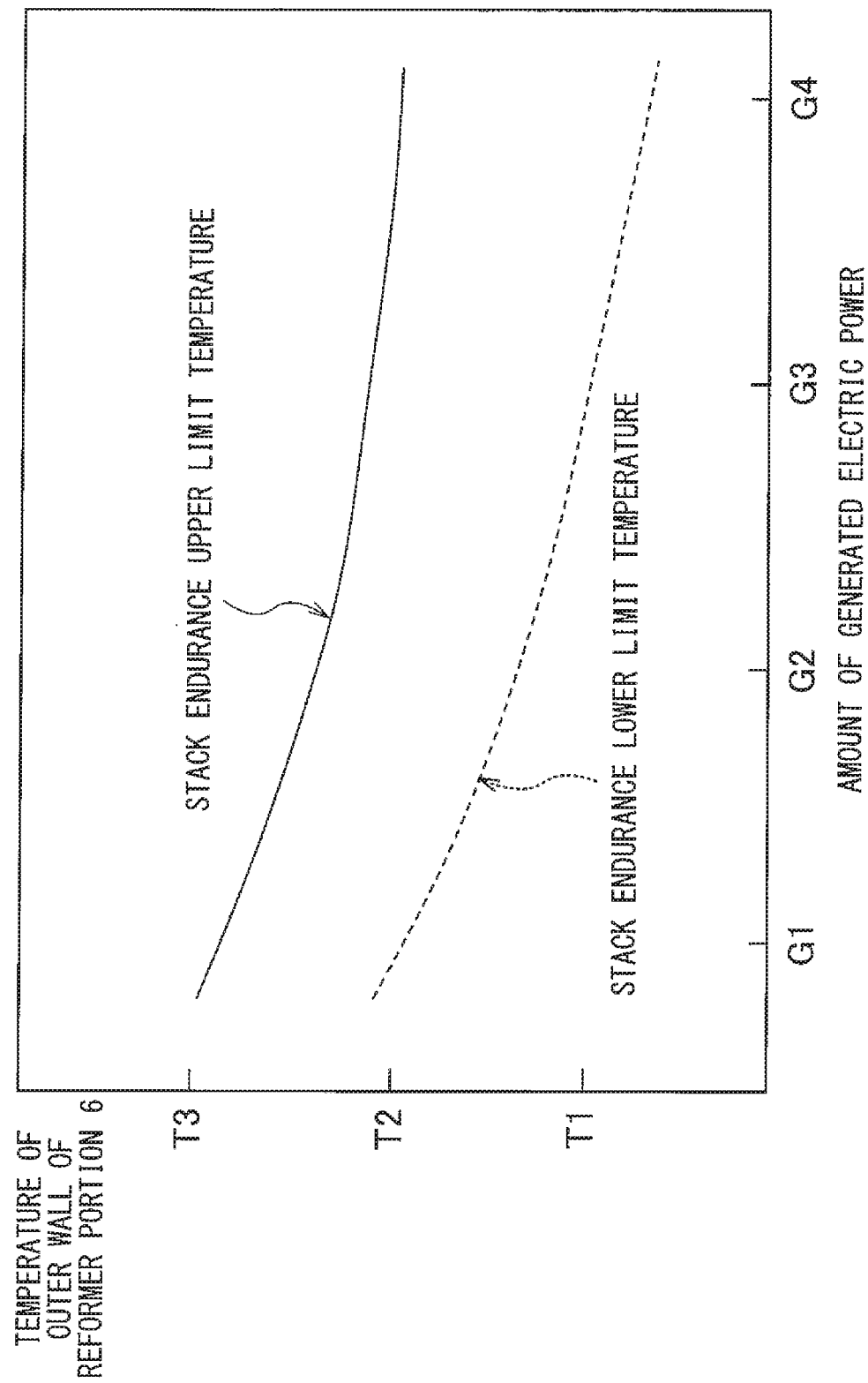
FIG. 8 is a graph showing temperature characteristics when generating electric power in the solid oxide fuel cell (SOFC) system according to Embodiment 3.

The table information 31 included in the SOFC system according to Modified Example 1 of Embodiment 3 will be explained in reference to FIG. 8. FIG. 8 is a graph showing the temperature characteristics when generating electric power in the solid oxide fuel cell (SOFC) system according to Embodiment 3. In the graph of FIG. 8, a horizontal axis shows the amount (G) of generated electric power, a vertical axis shows the temperature (T) of the outer wall of the reformer portion 6, a solid line shows the endurance upper limit temperature of the stack 4, and a broken line shows the temperature of the outer wall of the reformer portion 6 corresponding to the endurance lower limit temperature of the stack 4.

A predetermined value is set as each of the stack endurance upper limit temperature and stack endurance lower limit temperature of the stack 4. Each of the temperature of the outer wall of the reformer portion 6 corresponding to the stack endurance upper limit temperature and the temperature of the outer wall of the reformer portion 6 corresponding to the stack endurance lower limit temperature is dominated by, for example, a heat balance in the fuel cell module 1, the heat balance including an utilization ratio of the fuel utilized by the electric power generation, an utilization ratio of the electric power generation air, a combustion state, heat transfer from the combustion chamber 5 to the reformer portion 6, heat release at the reformer portion 6, and the like. Therefore, as shown in FIG. 8, each of the temperature of the outer wall of the reformer portion 6 corresponding to the stack endurance upper limit temperature and the temperature of the outer wall of the reformer portion 6 corresponding to the stack endurance lower limit temperature changes depending on the amount of generated electric power. As shown in FIG. 8, each of the temperature of the outer wall of the reformer portion 6 corresponding to the stack endurance upper limit temperature and the temperature of the outer wall of the reformer portion 6 corresponding to the stack endurance lower limit temperature tends to decrease as the amount of generated electric power increases. The reason for this is as follows. As the amount of generated electric power increases in the SOFC system, the utilization ratio of the fuel increases, so that the ratio of the fuel in the combustion chamber 5 decreases, and the ratio of the moisture increases. Therefore, the temperature of the flame generated in the combustion chamber 5 tends to decrease, and the combustion tends to become unstable.

When the amount of generated electric power changes at the time of the electric power generation, the temperature of the stack 4 may change to exceed the range from the stack endurance upper limit temperature to the stack endurance lower limit temperature. When the stack temperature that is a criterion of the reliability of the SOFC system changes, the temperature of the outer wall of the reformer portion 6 correlated to the stack temperature also changes. Therefore, the temperature of the outer wall of the reformer portion 6 is controlled in accordance with the amount of generated electric power such that the stack temperature falls within an appropriate set range (range from the stack endurance upper limit temperature to the stack endurance lower limit temperature).

To be specific, the change in the amount of generated electric power is regarded as corresponding to the change in the temperature of the outer wall of the reformer portion 6 corresponding to TDR (Turn Down Ratio) required for a combustion device, and a change range of a combustion amount of the combustion device is set based on the temperature of the outer wall of the reformer portion 6 corresponding to the stack endurance upper limit temperature and the temperature of the outer wall of the reformer portion 6 corresponding to the stack endurance lower limit temperature. Therefore, by controlling the temperature of the outer wall of the reformer portion 6 in accordance with the amount of generated electric power, the stack temperature can be controlled so as to fall within the endurance limit range (range from the stack endurance upper limit temperature to the stack endurance lower limit temperature).

Control Method

Next, a method of controlling the temperature of the outer wall of the reformer portion 6 in the SOFC system according to Modified Example 1 of Embodiment 3 will be explained.

Diffusion combustion of the fuel unconsumed in the electric power generation and the electric power generation air unconsumed in the electric power generation is performed at the time of the electric power generation, the fuel and the electric power generation air being ejected from the outlet portions 3a located at the upper portions of the cells 3. When the air ratio in the diffusion combustion is increased, both the stack temperature and the temperature of the reformer portion 6 decrease in proportion to the increase in the air ratio. In contrast, when the air ratio is decreased, both the stack temperature and the temperature of the reformer portion 6 increase in proportion to the decrease in the air ratio. Therefore, the temperature of the reformer portion 6 and the stack temperature corresponding to the temperature of the reformer portion 6 can be adjusted by adjusting the supplied air ratio in the diffusion combustion at the time of the electric power generation. More specifically, the temperature of the outer wall of the reformer portion 6 is controlled as below.

More specifically, when the main controller 19 determines based on the detection result from the temperature detecting sensor 18 that the temperature of the outer wall of the reformer portion 6 has exceeded the temperature corresponding to the stack endurance upper limit temperature, the main controller 19 first gives commands to the electric power generation air supply portion 12 and the electric power generation air flow rate controller 16 to cause the electric power generation air supply portion 12 and the electric power generation air flow rate controller 16 to increase the flow rate of the electric power generation air. The electric power generation air flow rate controller 16 increases the opening degree so as to increase the flow rate of the supplied electric power generation air in accordance with the command from the main controller 19, and the electric power generation air supply portion 12 supplies the reforming air to the fuel cell module 1 through the electric power generation air flow rate controller 16 at the flow rate based on the command from the main controller 19.

When the detection result from the temperature detecting sensor 18 does not fall within a set temperature range (endurance limit range) even by increasing the flow rate of the electric power generation air, the main controller 19 further gives commands to the raw material supply portion 10 and the raw material flow rate controller 14 to cause the raw material supply portion 10 and the raw material flow rate controller 14 to decrease the flow rate of the supplied raw material. The raw material flow rate controller 14 decreases the opening degree so as to reduce the flow rate of the supplied raw material in accordance with the command from the main controller 19, and the raw material supply portion 10 supplies the raw material to the fuel cell module 1 through the raw material flow rate controller 14 at the flow rate based on the command from the main controller 19.

In contrast, when the main controller 19 determines based on the detection result from the temperature detecting sensor 18 that the temperature of the outer wall of the reformer portion 6 has fallen under the temperature corresponding to the stack endurance lower limit temperature, the main controller 19 first gives commands to the electric power generation air supply portion 12 and the electric power generation air flow rate controller 16 to cause the electric power generation air supply portion 12 and the electric power generation air flow rate controller 16 to decrease the flow rate of the electric power generation air. When the main controller 19 determines that the detection result from the temperature detecting sensor 18 does not fall within the set temperature range even by decreasing the flow rate of the electric power generation air, the main controller 19 gives commands to the raw material supply portion 10 and the raw material flow rate controller 14 to cause the raw material supply portion 10 and the raw material flow rate controller 14 to increase the flow rate of the supplied raw material.

As above, the main controller 19 can cause the temperature of the outer wall of the reformer portion 6 to fall within the range from the temperature corresponding to the stack endurance upper limit temperature to the temperature corresponding to the stack endurance lower limit temperature.

When the temperature of the outer wall of the reformer portion 6 corresponding to the amount of generated electric power does not fall within the set temperature range corresponding to the endurance limit range even by the above control operations, the main controller 19 determines that abnormal combustion has occurred. Examples of the abnormal combustion include misfire, such as blow off and quenching. When the main controller 19 determines that the abnormal combustion has occurred, the main controller 19 gives commands to the raw material supply portion 10 and the raw material flow rate controller 14 to cause the raw material supply portion 10 and the raw material flow rate controller 14 to stop the supply of the raw material. Thus, the combustion is stopped.

Whether or not the abnormal combustion has occurred is determined as follows. To be specific, when the SOFC system is configured such that the temperature of the outer wall of the reformer portion 6 is controlled by decreasing or increasing the flow rate of the electric power generation air to falls within the set temperature range corresponding to the endurance limit range corresponding to the amount of generated electric power, the flow rate of the electric power generation air is changed by, for example, ±10%. If the temperature of the outer wall of the reformer portion 6 does not return to the set temperature range, the main controller 19 determines that the abnormal combustion has occurred. Further, when the SOFC system is configured such that the temperature of the outer wall of the reformer portion 6 is controlled by decreasing or increasing the flow rate of the raw material to fall within the set temperature range corresponding to the endurance limit range corresponding to the amount of generated electric power, the flow rate of the raw material is changed by, for example, ±5%. If the temperature of the outer wall of the reformer portion 6 does not return to the set temperature range, the main controller 19 determines that the abnormal combustion has occurred.

In the foregoing, the stack temperature is controlled to fall within the endurance limit range by adjusting the temperature of the outer wall of the reformer portion 6 such that the temperature of the outer wall of the reformer portion 6 falls within the set temperature range. However, the control operation is not limited to this. For example, the SOFC system may be configured such that: only the determination regarding whether or not the stack temperature does not fall within the endurance limit range is performed based on the temperature of the outer wall of the reformer portion 6; and when it is determined that the stack temperature does not fall within the endurance limit range, the flow rate of the electric power generation air or the flow rate of the raw material is changed as described above, and thus, the temperature of the stack 4 is directly controlled so as to fall within the endurance limit range. According to this configuration, a temperature detecting sensor is additionally provided at the stack 4.

Modified Example 2

The present inventors have found that the temperature of the outer wall of the reformer portion 6 that is the heated body and the CO concentration of the flue gas are correlated to each other. To be specific, the present inventors have studied the relation between the temperature of the outer wall of the reformer portion 6 and the concentration of CO contained in the flue gas. As a result, the present inventors have found that by increasing the air ratio of the electric power generation air supplied to the combustion chamber 5 of the SOFC system, the temperature of the outer wall of the reformer portion 6 decreases, but the diffusion of the reformed gas and the electric power generation air is promoted, so that the concentration of CO in the flue gas decreases. In contrast, the present inventors have found that by decreasing the air ratio of the electric power generation air supplied to the combustion chamber 5 of the SOFC system, the temperature of the outer wall of the reformer portion 6 increases, but the diffusion reaction between the reformed gas and the electric power generation air becomes inadequate, so that the concentration of CO in the flue gas increases. Therefore, the present inventors have found that the temperature of the outer wall of the reformer portion 6 can be controlled based on the relation between the temperature of the outer wall of the reformer portion 6 and the concentration of CO in the flue gas such that the carbon monoxide concentration of the flue gas becomes not more than a predetermined value (150 ppm, for example).

The SOFC system according to Modified Example 2 of Embodiment 3 is configured such that the temperature of the outer wall of the reformer portion 6 is controlled based on the correspondence relation between the temperature of the outer wall of the reformer portion 6 and the concentration of CO in the flue gas such that the concentration of CO in the flue gas becomes not more than the predetermined value. As above, when the SOFC system is configured such that the temperature of the outer wall of the reformer portion 6 is controlled based on the correspondence relation between the temperature of the outer wall of the reformer portion 6 and the concentration of CO in the flue gas such that the concentration of CO in the flue gas becomes not more than the predetermined value, the temperature of the outer wall of the reformer portion 6 can be controlled in consideration of the concentration of CO in the flue gas.

The SOFC system according to Modified Example 2 of Embodiment 3 is the same in configuration as the SOFC system according to Embodiment 3 except for the table information 31 stored in the storage portion 30. Therefore, the same reference signs are used for the same components as in Embodiment 3, and explanations thereof are omitted. In the SOFC system according to Modified Example 2 of Embodiment 3, the storage portion 30 stores the table information 31 that is information showing the correspondence relation between the temperature of the outer wall of the reformer portion 6 and the concentration CO in the flue gas in accordance with the change in the air ratio. Therefore, in the SOFC system according to Modified Example 2 of Embodiment 3, the main controller 19 can understand the concentration of CO in the flue gas based on the detection result from the temperature detecting sensor 18 in accordance with the air ratio of the electric power generation air supplied to the combustion chamber 5. The main controller 19 manages the flow rate of the air supplied from the electric power generation air supply portion 12 to the fuel cell module 1 through the electric power generation air flow rate controller 16, and the air ratio can be obtained based on the amount of generated electric power and the flow rate of the supplied air in the SOFC system.

Modified Example 3

Next, the SOFC system according to Modified Example 3 of Embodiment 3 will be explained. The SOFC system according to Modified Example 3 of Embodiment 3 is configured by the combination of Modified Examples 1 and 2 of Embodiment 3. The SOFC system according to Modified Example 3 of Embodiment 3 is configured such that the temperature of the outer wall of the reformer portion 6 is controlled based on the correspondence relation among the temperature of the outer wall of the reformer portion 6 corresponding to the amount of generated electric power, the stack temperature, and the concentration of CO in the flue gas such that the stack temperature falls within the endurance limit range in accordance with the amount of generated electric power, and the concentration of CO in the flue gas becomes not more than the predetermined value.

The SOFC system according to Modified Example 3 of Embodiment 3 is the same in configuration as the SOFC system according to Embodiment 3 shown in FIG. 6 except for the table information 31 stored in the storage portion 30. Therefore, the same reference signs are used for the same components as in Embodiment 3, and explanations thereof are omitted. The SOFC system according to Modified Example 3 of Embodiment 3 stores the table information 31 that is information showing the correspondence relation among the temperature of the outer wall of the reformer portion 6 corresponding to the stack endurance upper limit temperature and the amount of generated electric power, the temperature of the outer wall of the reformer portion 6 corresponding to the stack endurance lower limit temperature and the amount of generated electric power, the temperature of the outer wall of the reformer portion 6 corresponding to the change in the air ratio, and the concentration of CO in the flue gas. Then, the main controller 19 can refer to the table information 31 based on the set amount of generated electric power and the detection result from the temperature detecting sensor 18 and then control the temperature of the outer wall of the reformer portion 6 such that: the stack temperature falls within the endurance limit range; and the concentration of CO in the flue gas is suppressed so as to become not more than the predetermined value.

To be specific, when the flame stability is excellent and the combustion range is wide in the fuel cell module 1, the main controller 19 adjusts the temperature of the outer wall of the reformer portion 6 and preferentially performs such a control operation that the stack temperature falls within the endurance limit range. In contrast, when the flame stability is not excellent and the combustion range is narrow in the fuel cell module 1, and the concentration of CO in the flue gas reaches the predetermined value (150 ppm, for example), the main controller 19 adjusts the temperature of the outer wall of the reformer portion 6 and preferentially performs such a control operation that the concentration of CO in the flue gas becomes not more than the predetermined value. By the above control operations, the SOFC system according to Modified Example 3 of Embodiment 3 can obtain both the safety and the product life.

In the actual device, in consideration of the variations in the performance of the raw material supply portion 10 configured to supply the raw material and the performance of the electric power generation air supply portion 12 configured to supply the air, it is desirable that a range (combustion detection range) regarding the ignition determination described in Embodiment 3 and a range (combustion detection range) regarding whether or not the abnormal combustion described in Modified Example 1 of Embodiment 3 has occurred be wide.

Each of the SOFC systems according to Embodiment 3 and Modified Examples 1 to 3 of Embodiment 3 is configured such that the temperature of the outer wall of the reformer portion 6 is detected by the temperature detecting sensor 18 provided under the reformer portion 6 and in the vicinity of the outlet of the reformer portion 6. However, the position of the temperature detecting sensor 18 is not limited to the vicinity of the outlet. As long as the combustion status and the status of progress of the reforming reaction can be understood, the temperature detecting sensor 18 may be provided so as to detect the internal temperature of the reformer portion 6 or the temperature of the inner wall of the reformer portion 6. When the temperature detecting sensor 18 is provided on the outer wall of the reformer portion 6, it is preferable that the temperature detecting sensor 18 detect a temperature of a portion of the outer wall, the portion contacting the temperature detecting sensor 18. However, the present invention is not limited to this.

The components of the SOFC systems explained in Embodiments 1, 2, and 3 may be suitably combined with one another. From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The SOFC system according to the present invention is widely applicable to home-use fuel cell systems, business-use fuel cell systems, various power supply systems, and the like, each of which is configured such that: a raw material is ignited at the time of start-up; and a reforming reaction is performed by heating a reformer portion or the like using heat of generated flue gas.

REFERENCE SIGNS LIST 1 fuel cell module
2 auxiliary unit
3 cell
3a outlet portion
4 stack
5 combustion chamber
6 reformer portion
7 air preheating portion
8 igniting portion
9 exhaust gas purifying portion
10 raw material supply portion
11 reforming air supply portion
12 electric power generation air supply portion 13 water supply portion
14 raw material flow rate controller
15 reforming air flow rate controller
16 electric power generation air flow rate controller
17 water flow rate controller
18 temperature detecting sensor
19 main controller
20 exhaust gas outlet portion
21 purifying portion temperature detecting sensor
30 storage device
30 storage portion
31 table information

We claim:

1. A solid oxide fuel cell system comprising:
a fuel cell module including
   a fuel cell stack configured to cause a reaction between a reformed gas and electric power generation air to generate electric power, the reformed gas being generated by reforming a raw material,
   a reformer portion configured to reform the raw material to generate the reformed gas,
   an igniting portion configured to ignite the raw material when starting up the solid oxide fuel cell system, and
   a combustor that is a space where the raw material ignited by the igniting portion is combusted together with the electric power generation air;
a raw material supply portion configured to supply the raw material to the fuel cell module;
an electric power generation air supply portion configured to supply the electric power generation air to the fuel cell module;
a reforming air supply portion configured to supply reforming air to the reformer portion;
a water supply portion configured to supply reforming water to the reformer portion;
an exhaust gas purifying portion configured to purify a flue gas generated by the combustion in the combustor;
a flow rate controller configured to control flow rates of the raw material, the reforming air, the electric power generation air, and the reforming water; and
a purifying portion temperature detector provided at an inlet of the exhaust gas purifying portion and configured to detect a temperature of the inlet of the exhaust gas purifying portion, wherein
after the temperature of the inlet of the exhaust gas purifying portion detected by the purifying portion temperature detector becomes a predetermined temperature after the ignition, the water supply portion and the flow rate controller are configured to supply the reforming water or to increase the flow rate of the reforming water.

2. The solid oxide fuel cell system according to claim 1, wherein the exhaust gas purifying portion includes a catalyst for purification.

* * * * *